(12) United States Patent
Takei et al.

(10) Patent No.: US 12,343,291 B2
(45) Date of Patent: Jul. 1, 2025

(54) ELECTRIC MOBILITY VEHICLE SYSTEM IN A FACILITY

(71) Applicant: WHILL, Inc., Tokyo (JP)

(72) Inventors: Yusuke Takei, Tokyo (JP); Seiya Shimizu, Tokyo (JP); Keisuke Kawahara, Tokyo (JP)

(73) Assignee: Whill, Inc., Tokyo (JP)

( * ) Notice: Subject to any disclaimer, the term of this patent is extended or adjusted under 35 U.S.C. 154(b) by 706 days.

(21) Appl. No.: 17/540,746

(22) Filed: Dec. 2, 2021

(65) Prior Publication Data

US 2022/0087884 A1 Mar. 24, 2022

Related U.S. Application Data

(63) Continuation of application No. PCT/JP2020/038167, filed on Oct. 8, 2020.

(30) Foreign Application Priority Data

Feb. 20, 2020 (JP) .................................. 2020-027256

(51) Int. Cl.
*A61G 5/04* (2013.01)
*A61G 5/10* (2006.01)
*G08G 1/00* (2006.01)

(52) U.S. Cl.
CPC ............. *A61G 5/04* (2013.01); *A61G 5/1051* (2016.11); *A61G 5/1094* (2016.11);
(Continued)

(58) Field of Classification Search
CPC .................. A61G 5/04; A61G 2203/30; A61G 2203/726; B62K 5/01; G05D 1/02; G05D 1/0214; G05D 1/0287
See application file for complete search history.

(56) References Cited

U.S. PATENT DOCUMENTS

2004/0220735 A1* 11/2004 Adams ................ A61G 5/1051
180/907
2009/0043440 A1 2/2009 Matsukawa et al.
(Continued)

FOREIGN PATENT DOCUMENTS

CN 111708368 A 9/2020
CN 112237513 A 1/2021
(Continued)

OTHER PUBLICATIONS

International Search Report with English Translation for International Application No. PCT/JP2020/038167 mailed from the International Searching Authority (JP) on Dec. 8, 2020, 5 pages.
(Continued)

*Primary Examiner* — James A English
*Assistant Examiner* — Abigail R Hymel
(74) *Attorney, Agent, or Firm* — BainwoodHuang

(57) ABSTRACT

An electric mobility vehicle in a facility includes a mobility body having a wheel, a driving unit driving the wheel, and a seat for the user, and sensors, and the mobility body has a controller which controls the driving unit for at least one of automatic driving and automatic stopping by using detected data of the sensor, the controller is configured to be able to set a detection cancel area, which is an area where a part of the user can exist in front of the user, the electric mobility vehicle further includes a lower side sensor which detects an object to be avoided from under a footrest surface or from a front end portion of a footrest portion.

17 Claims, 20 Drawing Sheets

(52) U.S. Cl.
CPC .... *A61G 2203/30* (2013.01); *A61G 2203/726* (2013.01); *G08G 1/00* (2013.01)

(56) References Cited

U.S. PATENT DOCUMENTS

| | | | |
|---|---|---|---|
| 2011/0106310 A1 | 5/2011 | Kawaguchi et al. | |
| 2017/0123423 A1 | 5/2017 | Sako et al. | |
| 2018/0224853 A1* | 8/2018 | Izhikevich | G05D 1/0088 |
| 2018/0246514 A1 | 8/2018 | Mitomo et al. | |
| 2018/0252535 A1* | 9/2018 | Bhimavarapu | A61G 1/0281 |
| 2019/0038486 A1* | 2/2019 | Sato | A61G 5/10 |
| 2019/0041855 A1 | 2/2019 | Suzuki et al. | |
| 2019/0212732 A1 | 7/2019 | Takanashi et al. | |
| 2020/0241532 A1 | 7/2020 | Suzuki et al. | |
| 2020/0268577 A1* | 8/2020 | Lau | A61G 5/066 |
| 2020/0330296 A1* | 10/2020 | Sasai | G08G 1/16 |
| 2021/0004008 A1 | 1/2021 | Mitomo et al. | |
| 2021/0026136 A1* | 1/2021 | Amadio | G05D 1/0274 |
| 2021/0085541 A1 | 3/2021 | Takei et al. | |

FOREIGN PATENT DOCUMENTS

| | | | | |
|---|---|---|---|---|
| CN | 116238485 A | 6/2023 | | |
| EP | 2186610 A1 | 5/2010 | | |
| EP | 3336642 A1 | 6/2018 | | |
| EP | 3503068 A1 | 6/2019 | | |
| EP | 3730114 A1 | 10/2020 | | |
| EP | 3789001 A1 | 3/2021 | | |
| GB | 2563083 A * | 12/2018 | | A61G 5/08 |
| JP | H11231935 A | 8/1999 | | |
| JP | 2003024390 A | 1/2003 | | |
| JP | 2004313587 A | 11/2004 | | |
| JP | 2009110495 A | 5/2009 | | |
| JP | 2009136933 A | 6/2009 | | |
| JP | 4576445 B2 | 11/2010 | | |
| JP | 2011177205 A | 9/2011 | | |
| JP | 5035802 B2 | 9/2012 | | |
| JP | 2012226601 A | 11/2012 | | |
| JP | 2016027456 A | 2/2016 | | |
| JP | 2017046491 A | 3/2017 | | |
| JP | 2018065544 A | 4/2018 | | |
| JP | 2018160270 A | 10/2018 | | |
| JP | 2018169787 A | 11/2018 | | |
| JP | 2019111049 A | 7/2019 | | |
| JP | 2019144167 A | 8/2019 | | |
| JP | 2020102086 A | 7/2020 | | |
| JP | 2022061652 A | 4/2022 | | |
| WO | 2004092858 A1 | 10/2004 | | |
| WO | 2017029982 A1 | 2/2017 | | |
| WO | 2018037945 A1 | 3/2018 | | |
| WO | 2019124005 A1 | 6/2019 | | |
| WO | 2020013043 A1 | 1/2020 | | |
| WO | 2020138068 A1 | 7/2020 | | |

OTHER PUBLICATIONS

International Search Report and Written Opinion with English Translation for International Application No. PCT/JP2022/016733 mailed from the International Searching Authority (JP) on Jun. 14, 2022, 18 pages.

Partial European Search Report for European Application No. EP22832560.1, dated Oct. 10, 2024, 16 pages.

\* cited by examiner

FIG. 9

October 10, CURRENT TIME ▽

| | IDENTIFIER | STATE OF CHARGE | DA1 | DA2 | INTRUSION DURATION TIME | TRAVELLING STATE | SEATING SENSOR | LUGGAGE | POSITION | 8:00 — 9:00 — 10:00 — 11:00 |
|---|---|---|---|---|---|---|---|---|---|---|
| ELECTRIC MOBILITY VEHICLE | 1 | 80% | INTRUDING STATE | INTRUDING STATE | 30 sec | MANUAL: MOVING | YES | YES | AREA D | USER A IS USING │ RESERVED BY USER B |
| ELECTRIC MOBILITY VEHICLE | 2 | 90% | — | — | — | MANUAL: STOP | NO | NO | AREA A | |
| ELECTRIC MOBILITY VEHICLE | 3 | 50% | INTRUDING STATE | — | 5 sec | AUTOMATIC: MOVING | NO | NO | AREA F | USER C FINISHED |
| ... | ... | ... | ... | ... | ... | ... | ... | ... | ... | |
| OPERATOR | A | — | — | — | — | — | — | — | AREA A | ATTENDING TO USER D |
| OPERATOR | B | — | — | — | — | — | — | — | AREA E | |

ELECTRIC MOBILITY VEHICLE SYSTEM IN A FACILITY

CROSS-REFERENCE TO RELATED APPLICATIONS

This is a continuation of International Application PCT/JP2020/038167, claiming priority to Japanese patent application No. 2020-027256 filed on Feb. 20, 2020, with an international filing date of Oct. 8, 2020, which is hereby incorporated by reference herein in their entirety.

TECHNICAL FIELD

This invention relates to an electric mobility vehicle and a system in a facility.

BACKGROUND ART

As this kind of in-facility system, there is a known in-facility system in which a plurality of electric mobility vehicles are used, and a user manually moves one of the electric mobility vehicles in a facility, and after the user finished using the electric mobility vehicle, the electric mobility vehicle returns to a standby position by automatic driving. See PTL 1, for example.

Also, there is a known service using an electric mobility vehicle for a single person, which is capable of automatic driving. See PTLs 2 to 6, for example.

CITATION LIST

Patent Literature

{PTL 1} Japanese Unexamined Patent Application, Publication No. 2019-144167
{PTL 2} Japanese Unexamined Patent Application, Publication No. 2003-024390
{PTL 3} Japanese Unexamined Patent Application, Publication No. 2018-160270
{PTL 4} Japanese Unexamined Patent Application, Publication No. 2018-169787
{PTL 5} Japanese Unexamined Patent Application, Publication No. 2016-027456
{PTL 6} Japanese Unexamined Patent Application, Publication No. H11-231935

SUMMARY OF INVENTION

A first aspect of this invention is an electric mobility vehicle on which a user is to be seated to ride, the electric mobility vehicle including: a mobility body having a wheel, a driving unit for driving the wheel, and a seat on which the user is to be seated; and a sensor provided in the mobility body, wherein the mobility body comprises a controller which controls the driving unit by using detected data of the sensor for at least one of automatic driving and automatic stopping, the controller is configured to be able to set a detection cancel area, in the detected data, the detection cancel area is an area where a part of a body of the user, a part of clothes of the user, or a part of belongings of the user can exist, the detection cancel are is set in an area located in front of the user who is seated on the seat, the electric mobility vehicle further includes a lower side sensor which detects an object to be avoided in a lower side area regarding the detection cancel area from under a footrest surface of the user or from a front end portion of a footrest portion, and the controller controls the driving unit for an evading operation when the lower side sensor detects the object to be avoided in the lower side area.

A second aspect of the present invention is an electric mobility vehicle, on which a user is to ride, and which includes a wheel, a mobility body having a driving unit for driving the wheel, and a sensor provided in the mobility body, and the mobility body has a controller which controls the driving unit by using detected data of the sensor for at least one of automatic driving and automatic stop, on the basis of the detected data of the sensor, while the electric mobility vehicle is moving, the controller performs determination process in which a part of the body of the user, belongings of the user, things worn by the user, or luggage placed on a luggage carrier of the electric mobility is in an intruding state of intruding in a detection area of the sensor, and, when the intruding state is determined, the controller performs at least one of notification process using a notification device provided in the electric mobility, and process of changing a traveling state of the electric mobility by controlling the driving unit.

A third aspect of the present invention is a system in a facility, the system including: a plurality of the electric mobility vehicles according to any one of claims 4 to 9; a management computer which receives vehicle information of each of the plurality of electric mobility vehicles; and a display which displays the received vehicle information, wherein with regard to each of the plurality of electric mobility vehicles, the management computer receives information indicating the intruding state or that the process of changing the traveling state is performed due to the intrusion state, and, with regard to each of the electric mobility vehicles, the display displays the intruding state or that the process of changing the traveling state is performed due to the intrusion based on the information.

BRIEF DESCRIPTION OF DRAWINGS

FIG. 9 is a table showing an example of management data of the embodiment.

DESCRIPTION OF EMBODIMENTS

A system in an airport (a facility) according to a first embodiment of the present invention will be described below with reference to the accompanying drawings.

Figure 5:
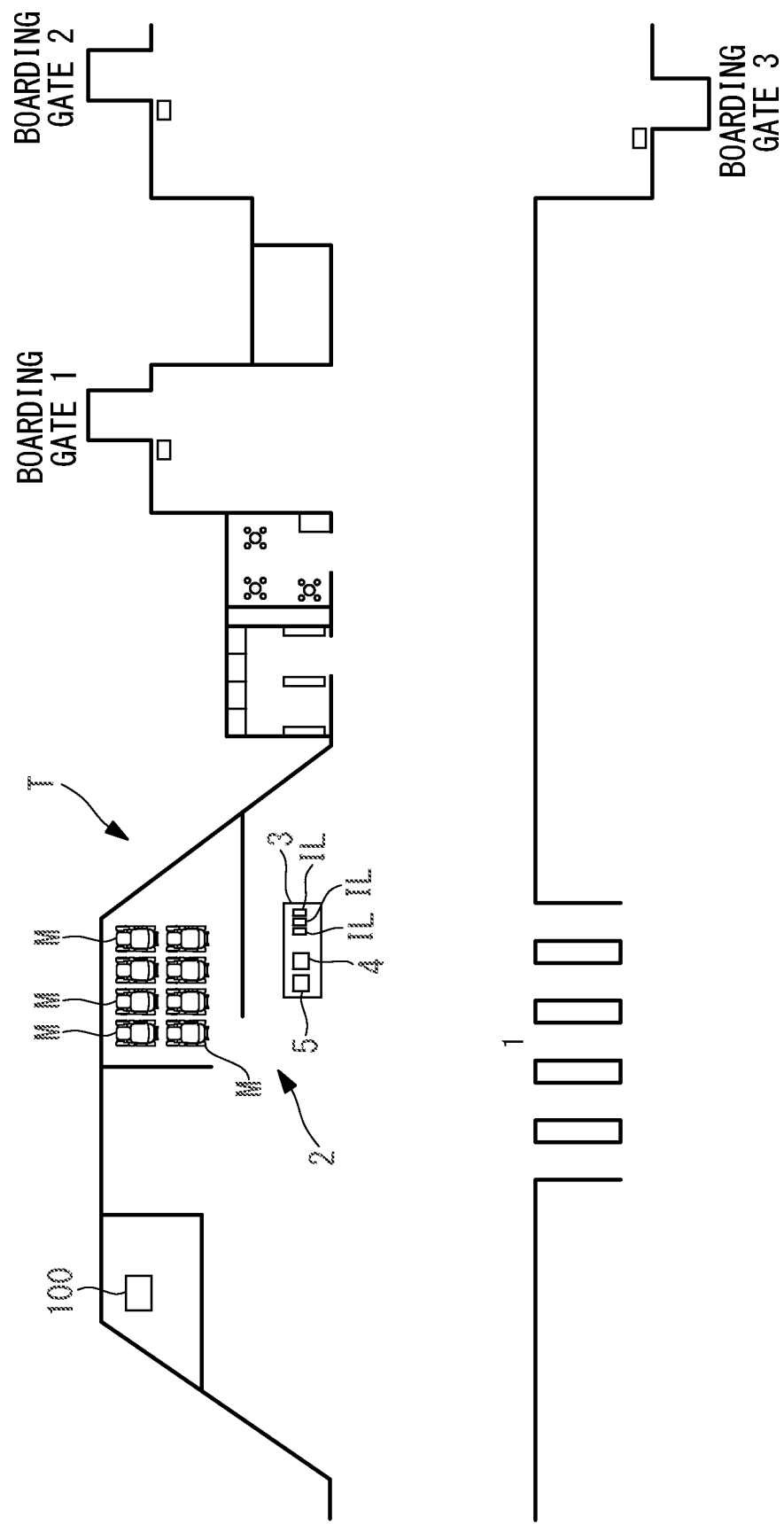
FIG. 5 is a schematic view of a system in an airport terminal T according to the embodiment.

As shown in FIG. 5, this system includes a plurality of electric mobility vehicles M placed in an airport terminal T, and a management computer 100 which manages the plurality of electric mobility vehicles M. The management computer 100 may not be placed in the airport.

Firstly, the electric mobility vehicle M of this embodiment will be described briefly. Note that, in this system, an electric mobility vehicle other than the electric mobility vehicle M described in this embodiment can be used.

As shown in FIGS. 1 to 4, this electric mobility vehicle M includes a mobility body 30 having a pair of front wheels (wheels) 10 and a pair of rear wheels (wheels) 20. Also, the mobility body 30 includes a seat unit (a seat) S. Another wheel may be provided in the mobility body 30 in addition to the front wheels 10 and the rear wheels 20, and the number of the front wheels 10 and the rear wheels 20 may be different from those described above. One of the pair of front wheels 10 and the pair of rear wheels 20 may not be provided. The electric mobility vehicle M of this embodiment is a kind of an electric wheelchair having the seat unit S on which a single user U is to be seated to ride.

The mobility body 30 has motors (driving units) MT which drive at least one of the pair of front wheels 10 and the pair of rear wheels 20.

In the description of this embodiment, a vehicle front-rear direction shown in FIGS. 3 and 4 may be referred to as a front-rear direction in the following description, and a vehicle width direction shown in FIGS. 3 and 4 may be referred to as a width direction or left-right direction in the following description. Note that, the vehicle front-rear direction and the front-rear direction of the electric mobility vehicle M and the mobility body 30 are identical with each other, and the vehicle width direction and the width direction of the electric mobility vehicle M and the mobility body 30 are identical with each other.

In this embodiment, the pair of rear wheels 20 are respectively connected to the motors MT, and each of the motors MT drives the corresponding rear wheel 20. Driving force of the motors MT may be transmitted to the corresponding front wheels 10 via a driving force transmitting means. The driving force transmitting means is a belt, gear, or the like.

Each of the front wheels 10 includes a hub 14 attached to an axle 11, and a plurality of roller support shafts (not shown) which are supported by the hub 14, and a plurality of rollers 13 are respectively supported by the roller support shafts so as to be rotatable. Note that, the hub 14 may be attached to the axle 11 by means of a bearing and the like, and the hub 14 may be attached to the axle 11 by means of a cushioning material, an intermediate member, or the like.

The rollers 13 rotate around an axis line of the corresponding roller support shafts. That is to say, an outer surface of each of the front wheels 10 is formed by the plurality of rollers 13, and the front wheels 10 are omnidirectional wheels which move in every direction with respect to a travel surface. Note that, in FIGS. 3 and 4, grooves in the rollers 13 are not shown.

In this embodiment, the rear wheels 20 include an axle which is not shown, a hub 21 attached to the axle, and an outer circumferential member 22 which is provided on the outer circumferential side of the hub 21, and the outer circumferential surface thereof is formed by using a material having rubber-like elasticity, however, the omnidirectional wheels may be used as the rear wheels 20, which are the same as the front wheels 10. The axle of the rear wheels 20 may be the same with a main shaft of the motor MT.

Structure of the mobility body 30 is changeable as required. In this embodiment, the mobility body 30 includes a base portion 32 which extends along the ground, and a seat support portion 33 which extends toward an upper side from a rear end side or the center portion of the base portion 32. The seat unit S is attached to the upper end side of the seat support portion 33.

Figure 3:
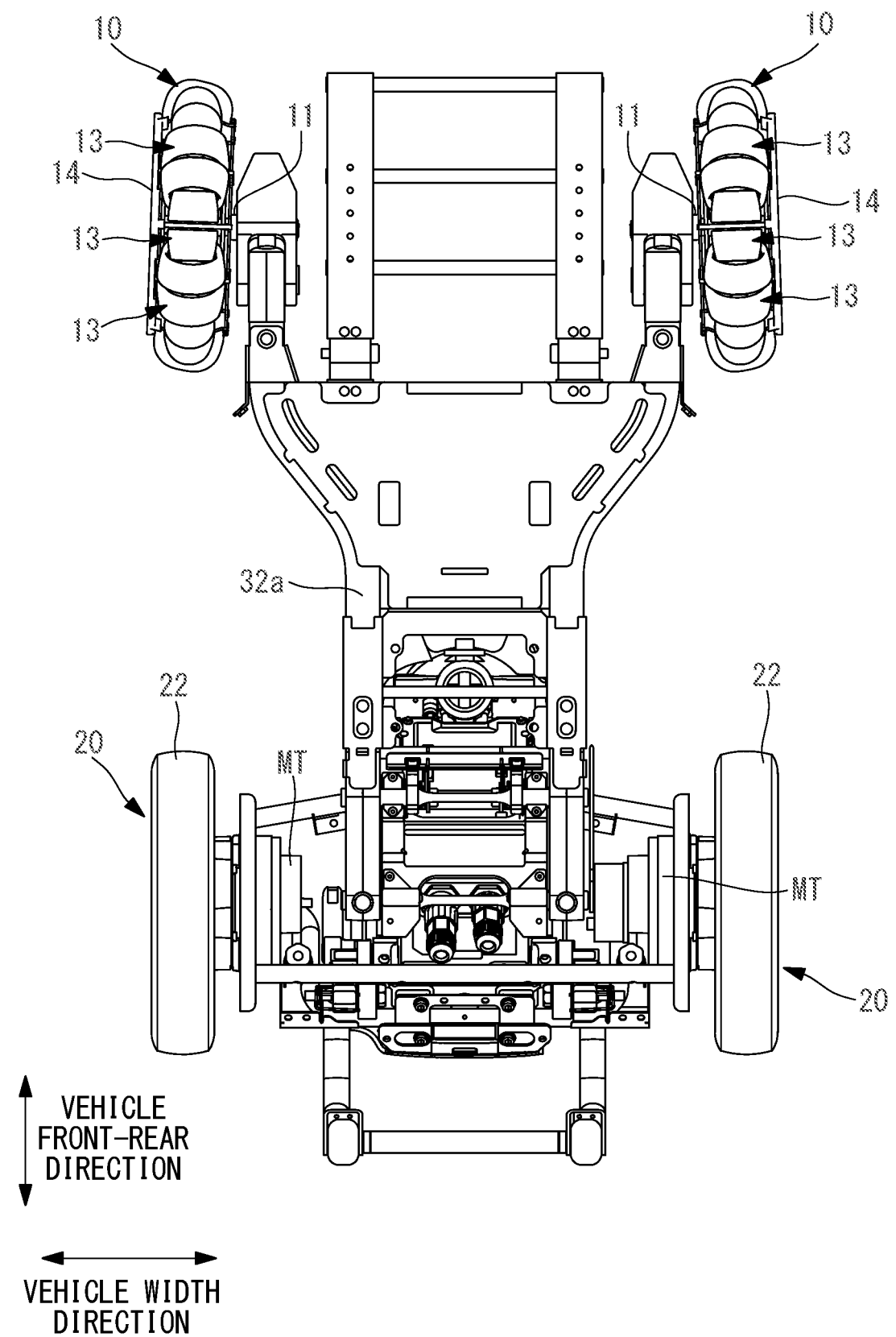
FIG. 3 is a bottom view in a state where a seating unit, a cover, or the like is detached from the electric mobility vehicle according to the embodiment.

The base portion 32 of this embodiment includes a plastic cover portion 32b, which is shown in FIG. 3, which at least partially covers the metal base frame 32a. The cover portion 32b is used as a portion for putting feet of the user U seated on the seat unit S, a portion for placing luggage, or the like.

In this embodiment, the seat unit S has a backrest portion 40, and a seat surface portion 50. The backrest portion 40 extends from a rear end of the seat surface portion 50 toward the upper side. A cushion 51 of the seat surface portion 50 is removable, and when the cushion 51 is removed, an upper surface of the seat support portion 33 and/or an under part structure 52 of the seat surface portion 50 is exposed.

In the seat support portion 33, a battery housing portion 34 which extends in a vertical direction is formed, and a battery BA having a longitudinal length in the vertical direction is accommodated in the battery housing portion 34.

Figure 2:
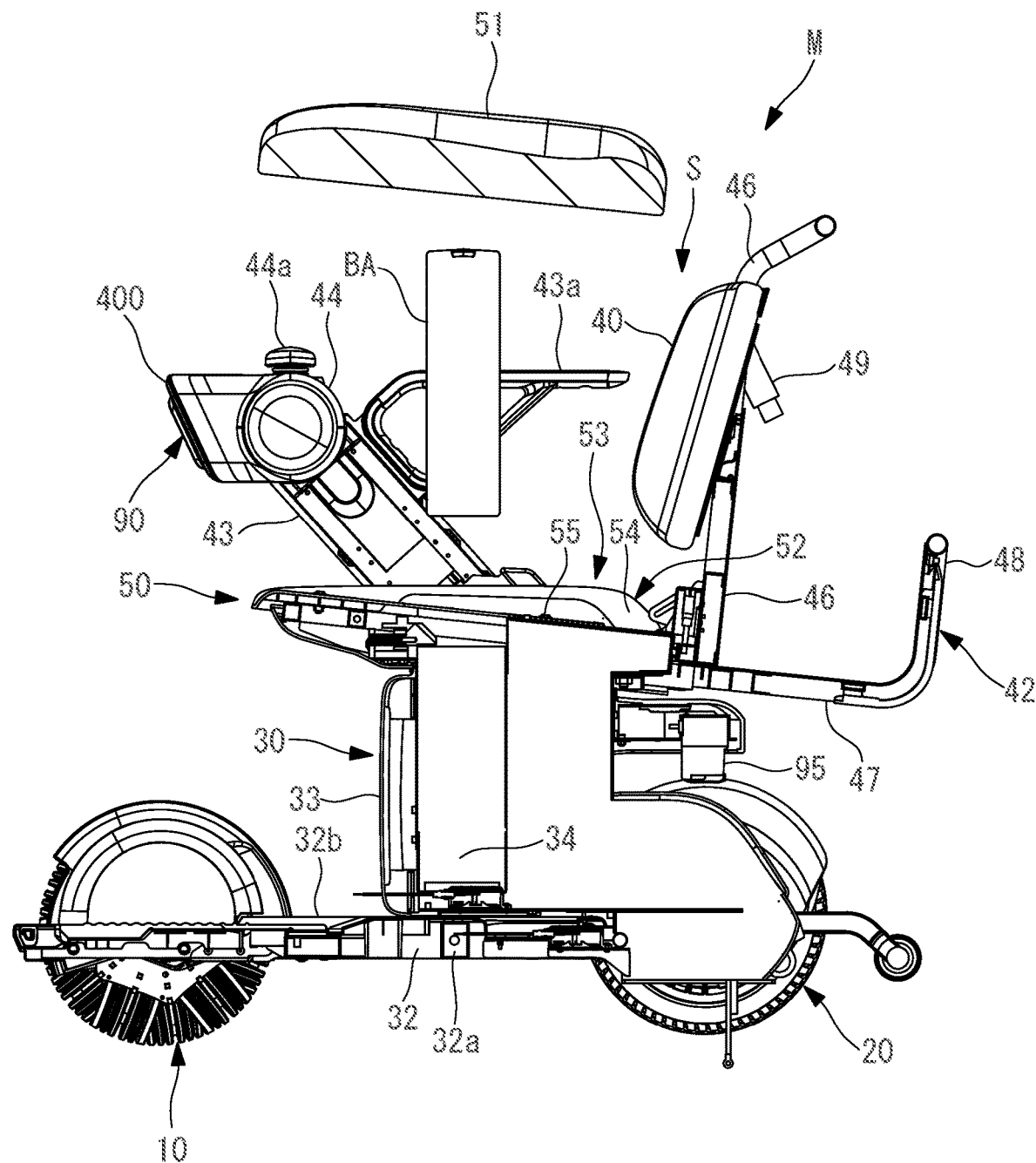
FIG. 2 is an exploded sectional view of a part of the electric mobility vehicle according to the embodiment.

As shown in FIG. 2, a seating sensor 53 is provided as a part of the under part structure 52 of the seat surface portion 50 in the upper end portion of the seat support portion 33. The seating sensor 53 includes a flexible member 54 supported at the upper end portion of the seat support member 33, and a detection device 55 positioned under the flexible member 54. The detection device 55 is a switch, a pressure sensor, or the like. In this embodiment, the detection device 55 is a switch. Also, the detection device 55 may be a deflection sensor attached at the flexible member 54. As described above, the detection device 55 may be a device which is capable of detecting deflection of the flexible member 54. Also, the seating sensor 53 may be the detection device 55 which is provided under the cushion 51, the lower surface thereof, inside thereof, or the like. In this case, it is not necessary to provide the flexible member 54. In addition, as the seating sensor 53, a known sensor, which has another structure and which can detect that the user U is seated on the cushion 51, may be used.

In this embodiment, when the user U is seated on the cushion 51, a part of the flexible member 54, for example, the center side thereof, is elastically deformed toward the lower side and the part of the flexible member 54 pushes the detection device 55, and because of the detection device 55 which is being pushed, a predetermined signal (electric current) or the like is sent from the detection device 55 to a controller 80, which is described below. That is to say, the controller 80 recognizes that the user U is seated on the seat surface portion 51.

The seat unit U has a right control arm 43, and a left control arm 43.

An armrest 43a is fixed to the upper surface of each of the control arms 43. For example, the user U (driver) puts the arms on the armrests 43a of the pair of the control arms 43, respectively. Also, the user U puts the arms on the upper ends of the pair of control arms 43, respectively. In this embodiment, both of the control arms 43 and the armrests 43a are provided, however, the control arms 43 or the armrests 43a may only be provided. In this case, the user U puts at least one of the arm and the hand on the control arm 43, or puts at least one of the arm and the hand on the armrest 43a.

An operation portion 44 having an operation lever (a joystick) 44a is provided at the right control arm 43, or the upper end of the armrest. In such a state where no force is applied, the operation lever 44a is positioned at a neutral position by a springy member (not shown) which is located within the operation portion 44.

Further, the operation portion 44 may be separately provided from the mobility body 30. In this case, the operation portion 44 may be a controller or the like, which is similar to a tablet computer, or a game controller of the user. In such a case where the operation portion 44 is a tablet computer, the operation lever 44a is not provided, and driving direction, driving speed, or the like of the electric mobility vehicle M is input by using a touch screen function of the screen of the tablet computer. In such a case where the operation portion 44 is provided separately from the mobility body 30, it is possible that a person other than the user U operates the movement of the electric mobility vehicle M on which the user U rides.

A signal, which is in response to displacement direction and displacement amount of the operation lever 44a, is sent from the operation portion 44 to the control unit 60, which will be described below, and the control unit 60 controls the motors MT in response to the received signal.

A setting portion (an input device) 45, which is for performing various sorts of settings related to the electric mobility vehicle, is provided at the upper end of the left control arm 43 or the arm rest 43a. Examples of the various sorts of settings include settings of maximum speed, settings regarding a driving mode, and settings for locking the electric mobility vehicle. A plurality of operation buttons, a display, and the like are provided at the setting portion 45.

Figure 1:
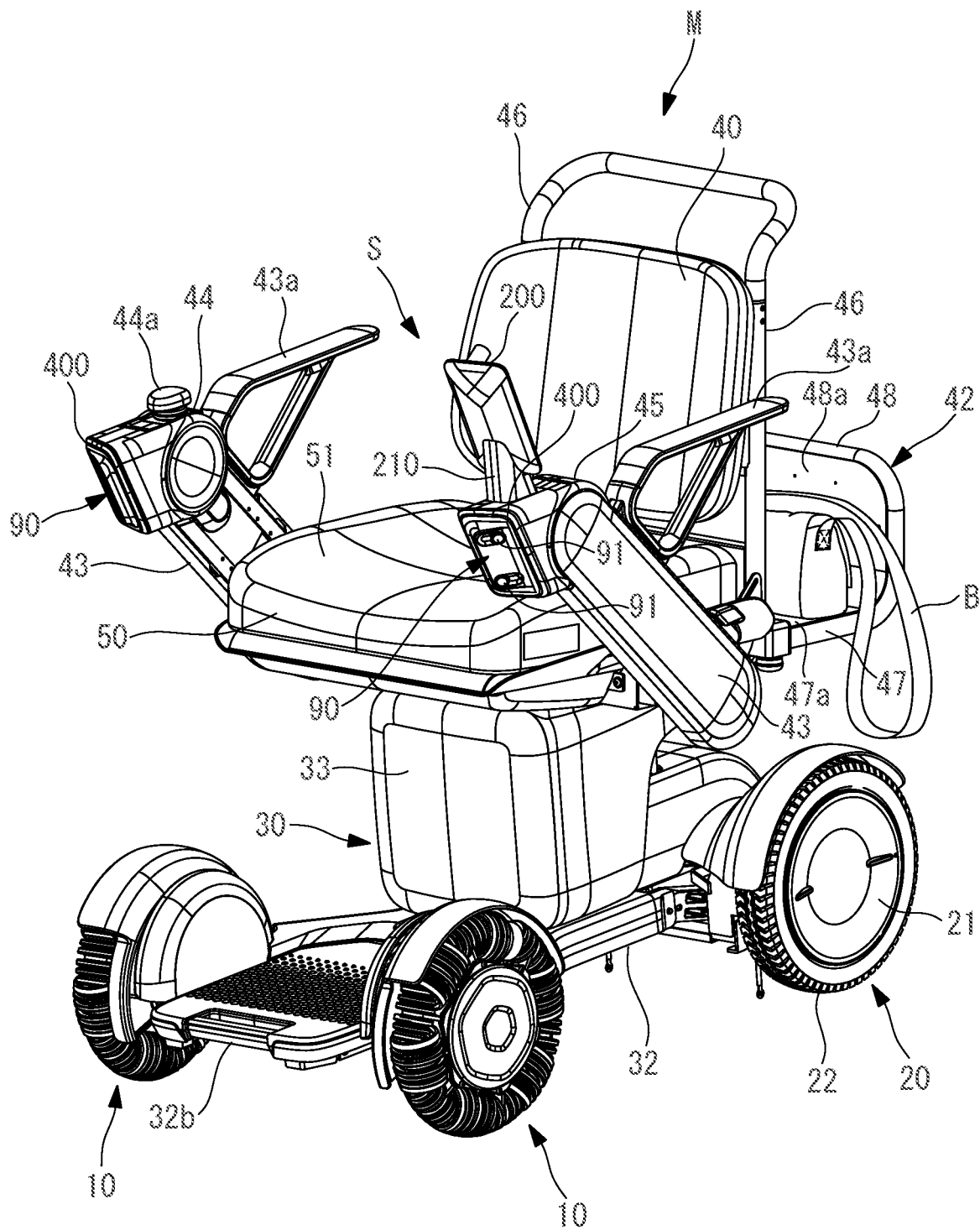
FIG. 1 is a perspective view of an electric mobility vehicle according to an embodiment of the present invention.

As shown in FIG. 1, the electric mobility vehicle M includes a display 200 which protrudes from the upper end surface of the left control arm 43 toward the upper side. The display 200 is supported by the left control arm 43 by means of a support member 210 which extends from the upper end surface of the left control arm 43 toward the upper side. Note that, in FIG. 4, the display 200 is not shown.

Information is sent to the display 200 from the controller 80, which is described below, by wire or wireless, and the display 200 displays the received information. For example, this information includes information of driving speed of the electric mobility vehicle M, information related to the state of the battery BA, information of a position of an object to be avoided detected by sensors, such as stereo cameras (first sensor) 90 or the like, information of determination results of whether or not the object to be avoided interrupts the driving, map information, information of driving path, or the like. Also, the display 200 has an input means such as a touch screen function or the like, and the information input to the display 200 is sent to the controller 80.

Moreover, the display 200 has a controller having a processor, memory, and the like, and this controller may perform a part or all the functions of the controller 80. Also, the display 200 may be removably attached to the support member 210.

Figure 6:
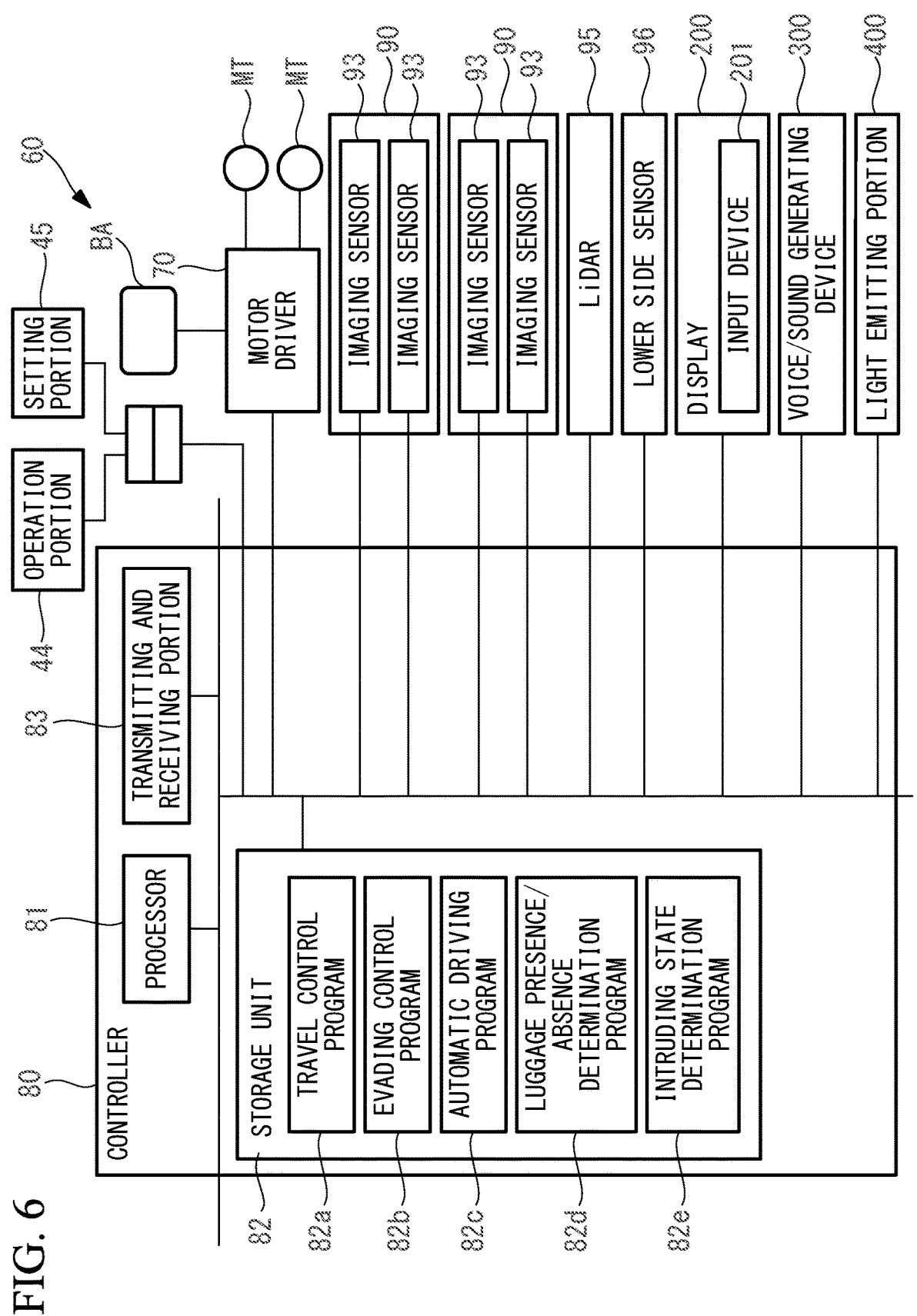
FIG. 6 is a block diagram of a control unit of the electric mobility vehicle of the embodiment.

As shown in FIG. 6, the control unit 60 has a motor driver 70 which drives the motors MT, and a controller 80.

The motor driver 70 is connected to the battery BA. Also, the motor driver 70 is connected to each of the motors 50 as well, and the motor driver 70 supplies drive power to the motors MT.

As shown in FIG. 6, the controller 80 includes a processor 81 such as a CPU and the like, a storage unit 82 having a non-volatile storage, a ROM, a RAM, and the like, and a transmitting and receiving portion 83 which transmits and receives information by wire or wireless. A travel control program 82a which controls the electric mobility vehicle M is stored in the storage unit 82. The processor 81 operates on the basis of the travel control program 82a. The processor 81 sends drive signals for driving the motors MT to the motor driver 70 on the basis of the signals from the operation portion 44 and the setting portion 45.

Figure 7:
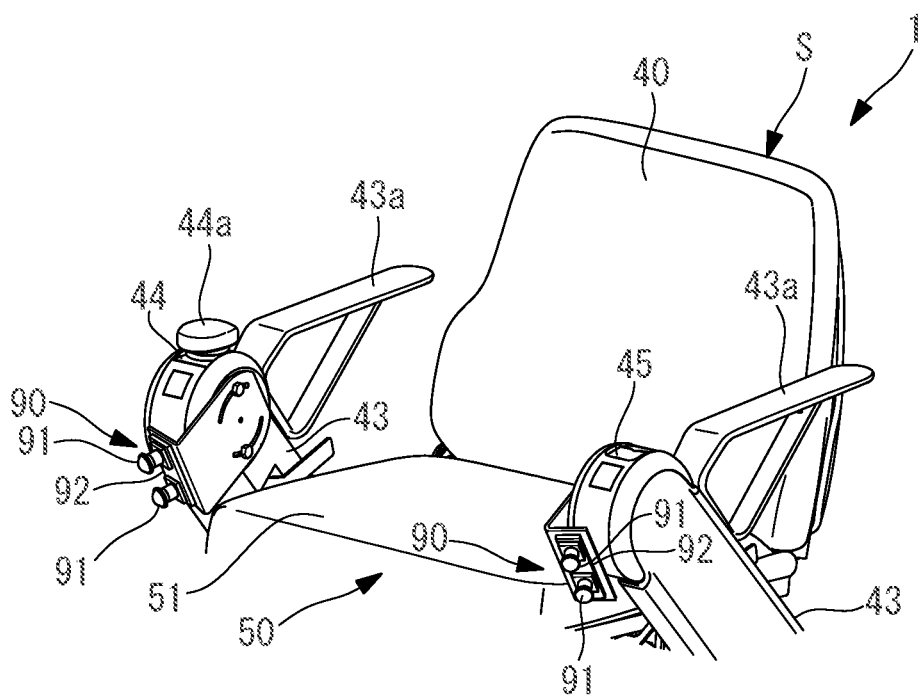
FIG. 7 is a perspective view of a seat unit of the electric mobility vehicle of the embodiment.

Stereo cameras (sensors) 90, each of which is a three-dimensional camera, are attached to the upper end sides of the right control arms 43 and the upper end sides of the left control arms 43. In such a case where the control arm 43 is not provided, the stereo camera 90 may be provided at the front end side of the arm rest 43a. As shown in FIG. 7, each of the stereo cameras 90 includes a pair lens units 91, and a camera main body 92 which supports the pair of lens units 91. In FIG. 7, a cover is removed so as to show internal structure of the stereo camera 90, and the seat unit S and the like are schematically drawn.

A pair of imaging sensors 93 (FIG. 6) is provided inside the camera main body 92, and the pair of imaging sensors 93 correspond to the pair of lens units 91, respectively. The imaging sensors 93 are known sensors, such as a CMOS sensor or the like. The imaging sensors 93 are connected to the controller 80. In one example, a detection area (a first intrusion detection area) DA1 of the stereo cameras 90 is located at the front side of the electric mobility vehicle and the outside in the width direction of the front wheels 10 (FIG. 4).

The mobility body 30 has a luggage carrier 42, such as a luggage rack, and the luggage carrier 42 is positioned at the rear end portion in the mobility body 30 or the back surface side of the seat unit S. As shown in FIGS. 1 and 2, in this embodiment, the luggage carrier 42 is supported by the rear end portion of the mobility body 30 and the back surface of the seat unit S. The luggage carrier 42 has a pair of frames 46 extending in the vertical direction along a backrest portion 40. The pair of frames 46 also support the backrest portion 40. This configuration is advantageous for downsizing the electric mobility vehicle in the front-rear direction.

The luggage carrier 42 has a pair of lower surface frames 47 each of which extends from the lower end of the frame 46 toward the vehicle rear side, and a back surface frame 48 which connects the pair of lower surface frames 47 to each other, and which extends from the pair of lower surface frames 47 toward the upper side. Also, the luggage carrier 42 has a lower surface plate 47a which is supported by the pair of lower surface frames 47, and a back surface plate 48a which extends from the rear end of the lower surface plate 47a toward a position close to the upper end of the back frame 48.

The pair of lower surface frames 47, the pair of back surface frames 48, and the lower surface plate 47a compose a bottom surface portion and a back surface portion of the luggage carrier 42, therefore, the size of the luggage carrier 42 itself is small, however, it is possible to stably carry relatively large luggage like a carry-on suitcase, or the like.

As shown in FIG. 2, a LiDAR (Light Detection and Ranging, or Laser Imaging Detection and Ranging) 95, which is a second sensor, is attached to the rear end portion of the seat support portion 33 or the seat unit S of the mobility body 30, or under the luggage carrier 42. In this embodiment, the LiDAR scans a laser beam over a detection area (a second intrusion detection area) DA2 shown in FIG. 4, and the LiDAR 95 detects the laser beam reflected by an obstacle. By using this detected result (detected data), the controller 80 detects an obstacle in the detection area DA2, which is located at the outside of the electric mobility vehicle in the width direction, and rear side of the electric mobility vehicle. For example, the obstacle is human, animal, plant, clothing, belongings of people. The obstacle may be a wall, relatively large object, a bump, and the like. In another example, the LiDAR 95 may detect an obstacle such as a bump, a hole, a gutter, or the like, in which the rear wheel 20 may be fallen or get caught. Also, each of the stereo cameras 90 detects the obstacles over the detection area DA1 in FIG. 4.

Also, another stereo camera for detecting the obstacle to be avoided located at the rear side and the sides in the width direction of the electric mobility vehicle M may be provided, another sensor capable of detecting the obstacles, such as a known radar, a milliwave sensor, or the like may be provided. Moreover, in order to detect the obstacles located at the outside of the front wheels 10 in the width direction, and the front sides of the front wheels 10 of the electric mobility vehicle, the LiDAR, the radar, the milliwave sensor, or the like may be provided, instead of the stereo cameras 90.

The controller 80 operates on the basis of an evading control program 82b and an automatic driving program 82c which are stored in the storage unit 82. The controller 80 creates distance images (detected data) by processing the parallax images (detected data) of the stereo camera (first sensor). And, the controller 80 detects the obstacle.

The controller 80 may recognize the obstacles by changing the data (detected data), which is obtained by the stereo cameras 90 and the LiDAR 95, into a two-dimensional plan view image, or may recognize the obstacles by treating the data as data in a three-dimensional space. The controller 80 may recognize the obstacles detected in the detection areas DA1 and DA2 by using a method other than the above described methods.

The controller 80 performs a known self-position estimation by using detected results of a GPS receiver, an odometer, the stereo cameras 90, the LiDAR 95, and the like, provided in the electric mobility vehicle M, on the basis of the automatic driving program 82c stored in the storage unit 82. Also, the controller 80 can, for example, set a route and drive automatically from a place of departure to a destination by using detected obstacles, map data stored in the storage unit 82, and the results of the self-position estimation, on the basis of the automatic driving program 82c.

In one example, the user U designates a place to go (destination) by using an input device 201 (FIG. 6) provided in the display 200, and the controller 80 performs the route-setting and the automatic driving from the place of departure, which is a current self-position, to the destination. The input device 201 may be a touch screen function of the display 200 or a button provided in the display 200, for example. An input device such as the operation portion 44, a button provided in the setting portion 45, or the like may be used instead of the input device 201.

The controller 80 controls the motors MT by control signals for evading operation or operates a notification device when the controller 80 detects an obstacle in a predetermined area in the detection areas DA1 and DA2, for example, on the basis of the evading control program 82b stored in the storage unit 82. Examples of the evading operation include reduction or stopping of the rotation speed of the motors MT (automatic stop function), controlling the motors MT so as to restrict the movement of the electric mobility vehicle toward the side of the object to be avoided, or the like. The object to be avoided is an obstacle which is located closer than a predetermined distance (1 m, several tens of centimeters, or the like) with respect to the sensor, the electric mobility vehicle M, or the like, among the obstacles, and which is highly possible to prevent the movement of the electric mobility vehicle M.

This system can be applied to various airport terminals T. As one example, this system is explained by using a schematic view of an airport terminal T which is shown in FIG. 5. Also, in this embodiment, as one example, the electric mobility vehicles M are used in a space for passengers after passing the security check in the airport terminal, however, the electric mobility vehicles M may be used in other areas in the airport terminal T.

In one example, in the airport terminal T, a management station (a lending counter) 2, which is a place for management, is provided in the vicinity of an exit of a security screening area 1, and a plurality of the electric mobility vehicles M are placed at the management station 2. Also, the management station 2 has a reception 3, and computers 4 are placed at the reception 3. The computer 4 is a known computer, such as a laptop computer, a tablet computer, or the like. The computers 4 are connected with a management computer 100 via a communication network, a communication line, or the like.

Figure 8:
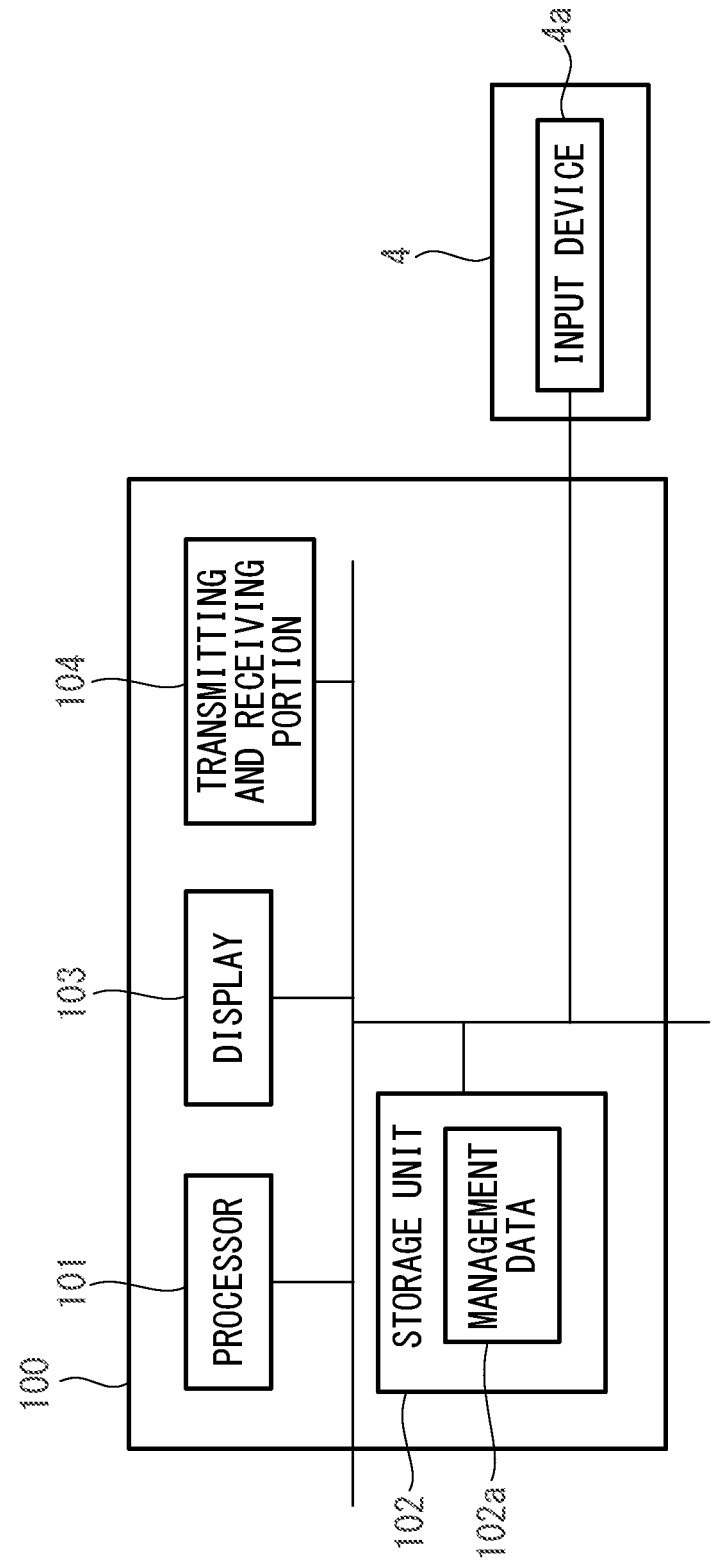
FIG. 8 is a block diagram of a management computer used in the embodiment.

As shown in FIG. 8, the management computer 100 includes a processor 101 having a CPU, a RAM, and the like, a storage unit 102 having a non-volatile storage, a ROM, and the like, a display 103, and a transmitting and receiving portion 104 which transmits and receives information by wire or wireless. Management data 102a for managing the plurality of electric mobility vehicles M is stored in the storage unit 102. The management data 102a is data for displaying a management table on a display 5 of the computers 4 and on the display 103 of the management computer 100.

In one example, the management data 102a is data for displaying the management table shown in FIG. 9 on the displays 5, 103. The management table shown in FIG. 9 includes a timetable. Identification information (identifier) of each of the electric mobility vehicles M is written in a corresponding one of the table rows in the management table, vehicle information of the corresponding electric mobility vehicle M, an estimated time of use by a user (usage information), a status of use by the user (usage information), a flight information written on a boarding pass of the user, and the like are written in each of the plurality of table rows in the management table. It can also be said that the flight information is information which includes information of a destination of the user, time information in connection with desired arrival time at the destination, and the like.

Also, in FIG. 9, the electric mobility vehicle M of Number 1 is being used by User A from 8:00. This is displayed on the management table of FIG. 9 as one example of the status of use. In FIG. 9, the electric mobility vehicle M of Number 3 is on the way back to the management station 2 by the automatic driving after User C finished using the electric mobility vehicle M. In this case, as one example of the status of use, it is shown in the management table of FIG. 9 that using the electric mobility vehicle M of Number 3 is finished.

Furthermore, as shown in FIG. 9, in an area other than the time table in the management table, a charge state of the battery BA, traveling state of the electric mobility vehicle M, a detected state of the seat surface sensor 53 attached to the electric mobility vehicle M, a detected state of the luggage placed on the luggage carrier 42, and the like are displayed as the vehicle information. As the traveling state, the electric mobility vehicle M is manually driven, manually stopped, automatically driven, automatically stopped, and the like are displayed. As another example, the electric mobility vehicle M is manually driven or automatically driven is displayed as the traveling state. It is not shown in FIG. 9, however, as the flight information, information of a destination of the user, time information in connection with desired arrival time to the destination, and the like may be displayed in the management table. For example, a gate number represents the destination, and boarding time represents the desired arrival time, and the like.

In one example, as shown in FIG. 2, a occupancy sensor (visual sensor) 49 is attached to the upper end portion of the luggage carrier 42 so that at least a placement surface of the luggage carrier 42 is located in a field of view of the occupancy sensor 49. As the occupancy sensor 49, a two-dimensional camera, a three-dimensional camera, a three-dimensional distance sensor, a LiDAR, or the like can be used. A luggage presence/absence determination program 82d is stored in the controller 80. The controller 80 operates on the basis of the luggage presence/absence program 82d, and by using image data obtained by the occupancy sensor 49, the controller 80 determines whether or not the luggage is detected on the luggage carrier 42.

Also, instead of the visual sensor, a sensor such as an obstacle detection sensor, a load sensor, a known radar sensor, or the like may be provided as the occupancy sensor 49. The object detection sensor is a known photo electronic sensor or the like, and the load sensor is a known pressure sensor or the like. In these cases, the controller 80 determines presence/absence of the luggage on the luggage carrier 42 on the basis of the detected results of the object detection sensor, the load sensor, the radar sensor, or the like. And, in the management table of FIG. 9, the detected state of the luggage is displayed.

Figure 4:
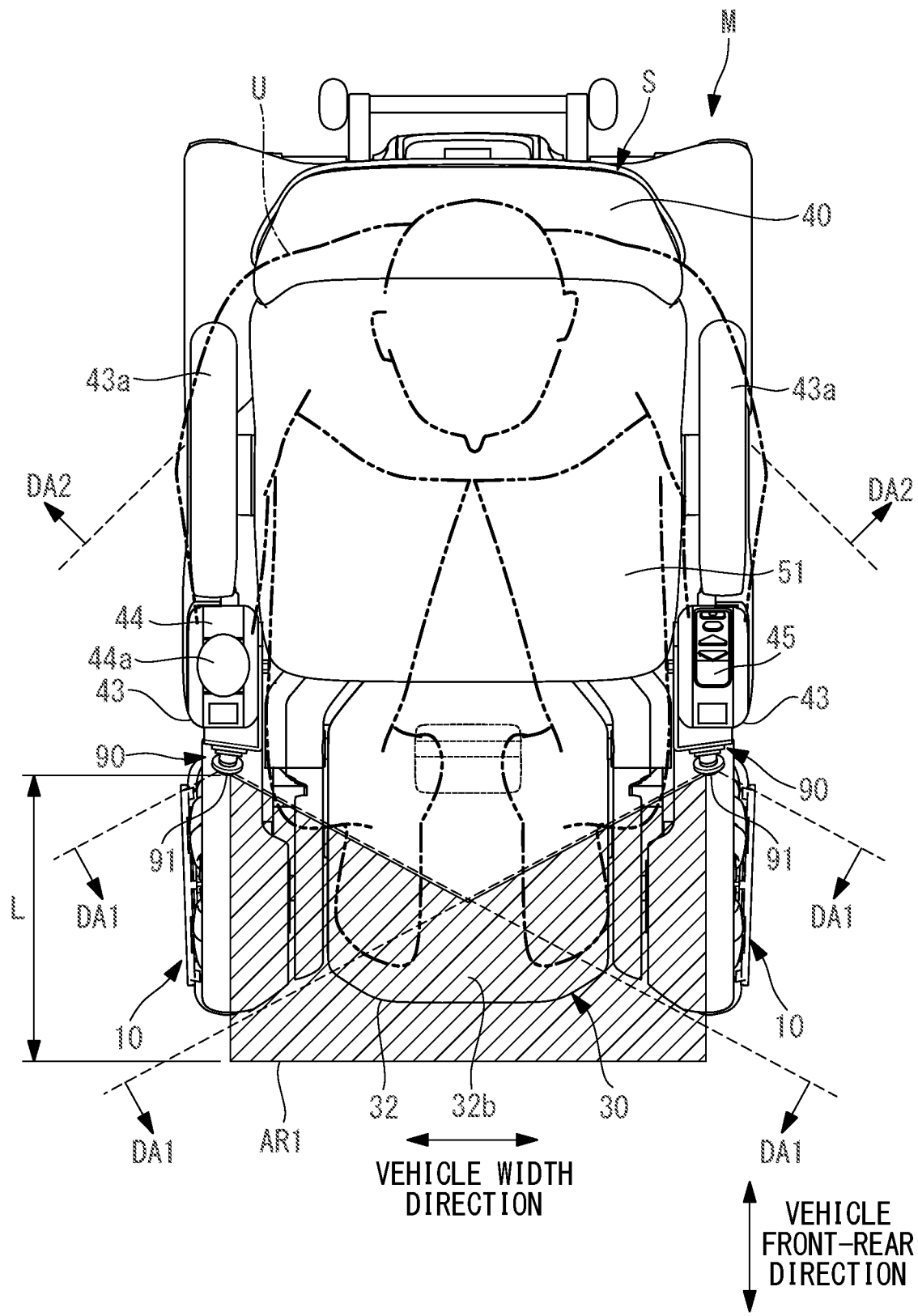
FIG. 4 is a plan view of the electric mobility vehicle according to the embodiment.

Also, as shown in FIG. 4, the management table of FIG. 9 displays the intruding state in which a part of the body of the user U, for example, is being placed in the detection area DA1 of the stereo cameras 90. Moreover, the management table of FIG. 9 displays the intruding state in which a part of luggage B placed on the luggage carrier 42 is being placed in the detection area DA2 of the LiDAR 95.

The system which is configured as described above is operated in the following manner, in one example.

Roughly, the system of this embodiment has a preparation step (Step S1), an assignment step (Step S2), an instruction step (step S3), a traveling step (Step S4), an automatic returning step (Step S5), and a post-processing step (Step S6). Steps S1 to S6 may not partially be operated in accordance with a situation and a request.

In Step S1, a provider of the service prepares the electric mobility vehicles M or the like.

In Step S2, the provider of the service or the management computer 10 receives a request for using the electric mobility vehicle M and information from a user U who wishes to use the electric mobility vehicle M. Step S2 may be performed before Step S1 or may be simultaneously performed with Step S1. The user U may inform the request (reservation) including date of use of the electric mobility vehicle M via a communication means such as telephone or the like, to the provider of the service beforehand. In such a case where the provider of the service receives the information, the information is input to the computer 4 and/or the management computer 100 by using the input device 4a (FIG. 8) of the computer 4. Examples of the information include information written on the boarding pass, name of the user U, a telephone number of the user U, and the like. Especially, the flight information including at least one of the flight number, the gate, and the boarding time which are written on the boarding pass is received. As the information, information in connection with a body of the user U, information of sexuality of the user U, information written on the passport of the user U, and the like may be received, however, it is preferable that the amount of the information received from the user U is small.

Also, in Step S2, the provider of the service or the management computer 100 assigns one of the electric mobility vehicles M to the user U on the basis of the date of use, the information, and the like. At this time, in the management computer 100, the assigned electric mobility vehicle M is made associated with the information.

Next, in Step S3, the provider of the service informs the user U what can be done, what cannot be done, manners, what is prohibited, and the like when using the electric mobility vehicle M, and whether or not the user U can agree with the above is confirmed.

In Step S3, the provider of the service performs predetermined operation on the display 200, the setting portion 45, the computer 4, or the like, and therefore, an instruction page is displayed on the display 200.

In one example, a program for displaying the instruction page is stored in the storage unit 82 of the controller 80, and the controller 80 makes the display 200 display the instruction page. Instead of this, the controller 80 or the display 200 receives the instruction page from a computer, such as the management computer 100 or the like, and the received instruction page may be displayed on the display 200.

Note that, the instruction page may be displayed on the display 5 of the computer 4 placed at the reception 3 or a display of another computer.

The instruction page includes explanation with regard to an error which occurs at the time of the intruding state, in which a part of a body of the user U, such as a knee or the like, belongings carried by the user U, something worn by the user U, or the like enters into the detection area DA1 of the stereo cameras 90. This error relates to influence on the detection of the obstacles in the detection area DA1, for example. The belongings are a handbag, a stick, or the like. Something worn by the user U includes, for example, clothes such as a skirt, a cloak, a hat, a scarf, or the like, a helmet, an ornament, and the like. Also, the instruction page includes explanation that the display 200, a voice/sound generating device 300, a light emitting portion 400, or the like notifies the intruding state to the user U when the intrusion is made in the detection area DA1.

Moreover, the instruction page includes explanation with regard to an error which occurs at the time of the intruding state in which a part of the luggage B on the luggage carrier 42 such as a strap or the like enters into the detection area DA2 of the LiDAR 95. This error has an influence on the detection of the obstacles in the detection area DA2, for example. The luggage B includes a bag, a coat, a scarf, a paper bag, a plastic bag, a cardboard box, a suitcase, and the like. Also, the instruction page includes explanation that the display 200, the voice/sound generating device 300, a light emitting portion 400, or the like notifies that the electric mobility vehicle M is in the intruding state when the intrusion is made in the detection area DA2.

In one example, in order to teach the user U an area which causes the intruding state, on the basis of the input to the input device provided in the mobility body 30 of the electric mobility M, in an example, the controller 80 performs a stop-state determination process so as to determine whether or not the electric mobility vehicle M is in the intruding state, in a state where the electric mobility vehicle is being stopped. In this embodiment, the instruction page displays instruction which makes the user U or the provider of the service perform the input. The controller 80 performs the stop-state determination process on the basis of an intruding state determination program 82e which is stored in the storage unit 82. In one example, this input device is the input device 201 of the display 200.

For example, when the user U or the provider of the service performs the input, the controller 80 performs the stopping state determination process. And, when the intruding state is determined, the controller 80 displays, on the display 200, that the electric mobility vehicle M is in the intruding state on the display 200, and when non-intruding state is determined, the controller 80 displays that the electric mobility vehicle is in a non-intruding state. This display is one structure of the above described notification. Instead of displaying on the display 200, it may also be possible to inform the intruding state and the non-intruding state by using a voice/sound generating device 300, such as a speaker or the like, provided in the mobility body 30. In one example, from the voice/sound generating device 300, voice or sound for indicating the intrusion is output, and also voice or sound for indicating the non-intruding state is output. The state in which the electric mobility vehicle M is intruding or not intruding is displayed, therefore, the user U can recognize the area regarded as the intruding state.

In the controller 80, as shown in FIG. 4, an intrusion detection area AR1, which detects the intrusion, is set within the detection area DA1. The intrusion direction area AR1 is an area located in front of the user U, and an area within a distance L from a user-side end of the detection area DA1 in the front-rear direction. In one example, it is preferable that the distance L is less than 50 cm, and less than 30 cm is more preferable. The intrusion detection area is set in the detection area DA2 as well.

In a state where the input for performing the stop-state determination process is not made to the input device, the controller 80 may perform the stop-state determination process. In this case, when a knee, a foot, clothes, or the like of the user U is placed in the intrusion detection area AR1, the controller 80 performs the above notification. When a part of the luggage B enters into the intrusion detection area in the detection area DA2, the same or a similar notification is performed. The luggage carrier 42 is located at the back surface side of the seat unit S, and therefore, it is hard for the user U who is seated on the seat unit S to visually check a state of the luggage placed on the luggage carrier 42. For that reason, the notification that the luggage is intruding into the intrusion detection area in the detection area DA2 is advantageous for preventing a damage of the luggage B or malfunction or the like occurred in the movement of the electric mobility vehicle M, which is caused by protrusion of the luggage B from the luggage carrier 42.

Also, the instruction page may include an instruction to have the knees of the user U move toward the outside in the width direction. For example, such instruction is made by using the display 200 or the voice/sound generating device 300. By this, the user U can know the area regarded as the intruding state before using the electric mobility vehicle M.

Also, an instruction list IL (FIG. 5) may be placed at the management station (lending counter) 2. In one example, the various instruction described above are listed in the instruction list IL. Further, the detection areas DA1, DA2 of the electrical mobility vehicle M are shown with pictures in the instruction item IL. The instruction list IL is made of a paper, a plastic sheet, or a plate. The provider of the service can give the instruction to the user U by showing the instruction list IL. By this, the user U can effectively understand, in a limited period of time, that the notification is made by the notification device of the electric mobility vehicle M when the electric mobility vehicle M is intruding into the detection areas DA1 and DA2 and that an existence of detection areas DA1 and DA2.

Figure 10:
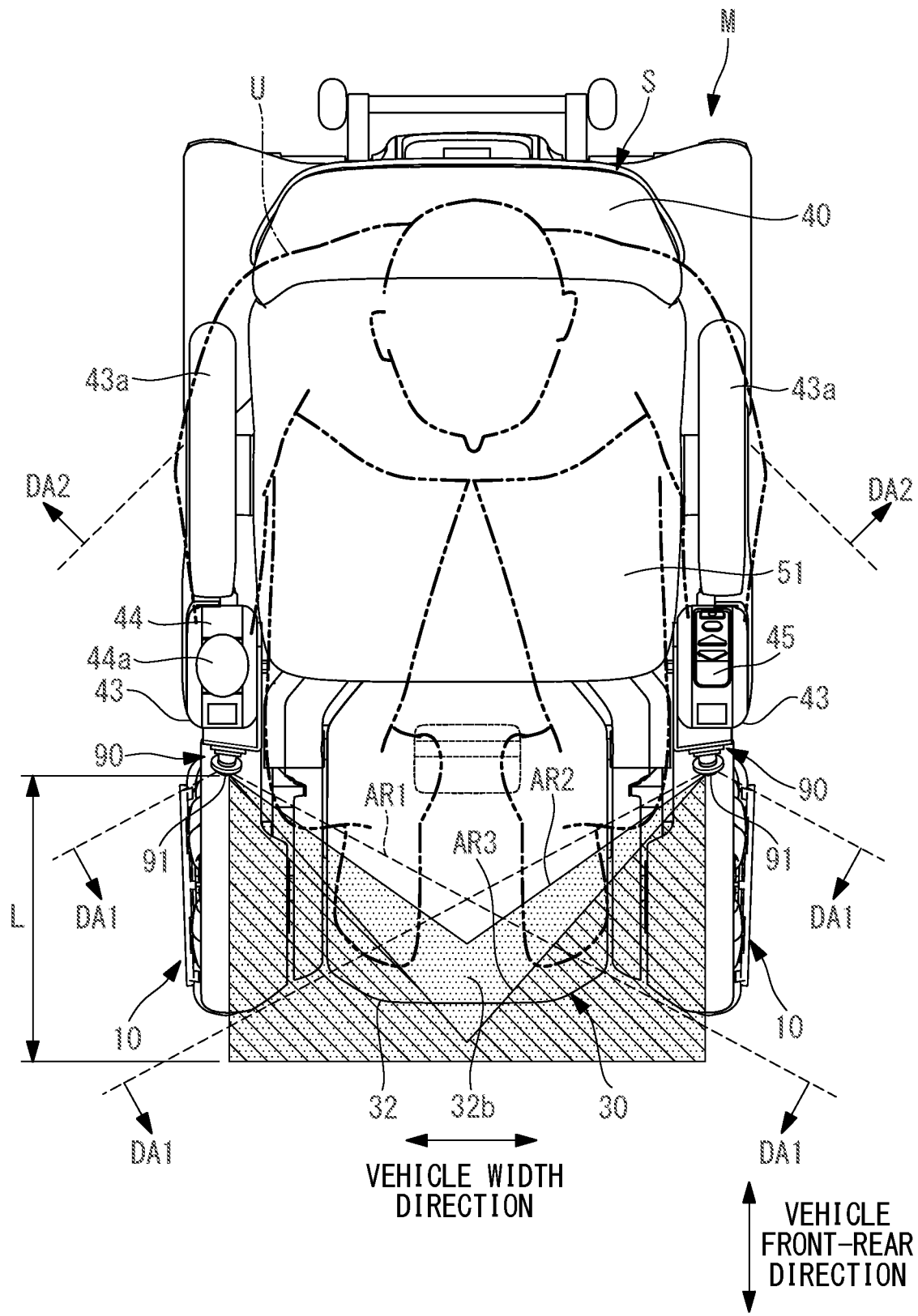
FIG. 10 is a plan view of the electric mobility vehicle of the embodiment.

In this embodiment, as shown in FIG. 10, an alternative candidate areas AR2, AR3 are set in the controller 80, other than the intrusion detection area AR1. When the provider of the service operates the input device 201 provided in the electric mobility vehicle M, the instruction detection area AR and the alternative candidate areas AR2 and AR3 which are currently set are shown on the display 200. With regard to the intrusion detection area in the detection area DA2, the display which is the same as or similar to that of the instruction detection area AR1 is displayed. Also, with regard to the intrusion detection area in the detection area DA2, the process which is the same as or similar to that of the intrusion detection area AR1 is performed, which will be described below.

The display 200 may display the intrusion detection area AR1 and the alternative candidate areas AR2, AR3 as a part of the instruction page on the display 200. Also, on the basis of an input made to a computer (a predetermined computer) of the provider of the service, the intrusion detection area AR1 and the alternative candidate areas AR2, AR3 may be displayed on the display 200. By this display, the user U and the provider of the service can easily recognize the positions of the knees, the feet, the clothes, and the like of the user U with respect to the intrusion detection area AR1 and the alternative candidate areas AR2, AR3.

Preferably, together with a picture of a machine body of the electric mobility vehicle M, the instruction detection area AR1 and the alternative candidate areas AR2, AR3 are displayed on the display 200. More preferably, the detected results of the stereo cameras 90, such as the knees, the feet, the clothes, and the like of the user U are displayed on the display 200.

Also, in the above described case, only the intrusion detection area AR1 may be displayed on the display 200, and the alternative candidate areas AR2, AR3 may not be displayed. In this case also, the user U and the provider of the service can easily recognize the positions of the knees, the feet, and the clothes of the user U with respect to the intrusion detection area AR1.

After the intrusion detection area AR1 and the alternative candidate areas AR2, AR3 are displayed on the display 200, and when one of the alternative candidate areas AR2, AR3 is chosen in the input device 201 of the display 200, the controller 80 changes the intrusion detection area AR1 into the chosen one of the alternative candidate areas AR2, AR3. This configuration is useful for achieving easy settings on the basis of the figure, clothes, condition, and the like of the user U, and is also useful for improving comfortability of the user U.

Also, the controller 80 may change the intrusion detection area AR1 on the basis of the input to the input device 201 of the display 200 or a computer (a predetermined computer) of the provider of the service. For example, when a moving amount toward the front side of the intrusion detection area is input to the input device 201, at least the edge located at the side close to the user U of the intrusion detection area AR1 moves forward on the basis of the moving amount. This configuration is useful for improving the comfortability of the user U.

Next, in Step 4, in this embodiment, the user U moves the electric mobility vehicle M by operating the operation lever 44a of the operation portion 44. Instead of this, the electric mobility vehicle M may start the automatic driving on the basis of the operation of the input device 201 by the user U. In this case, the controller 80 controls the motors MT so as to move toward its destination which is input to the input device 201, and by this, the electric mobility vehicle M moves to the destination by the automatic driving.

In Step 4, the controller 80 performs determination process, which determines the intruding state in which the part of the body of the user U, the belongings of the user U, the clothes of the user U, or the luggage B placed on the luggage carrier 42 is intruding into the intrusion detection area in the detection area DA1 and that in the detection area DA2. Also, at least one of notification process and process which changes the traveling state are performed when the controller 80 determines the intruding state.

An example of the process which is performed on the basis of the intrusion determination program 82e of the controller 80 in this case will be described below in reference to the drawings.

Figure 11:
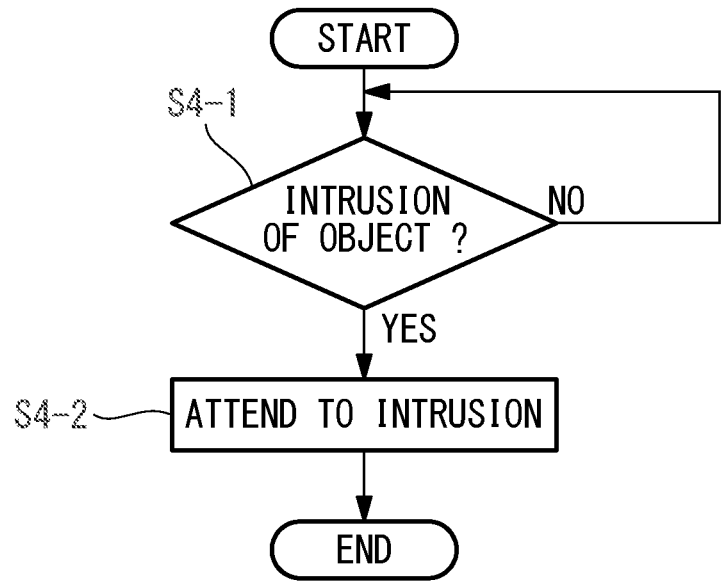
FIG. 11 is a flow chart showing an example of process of a controller of the electric mobility vehicle of the embodiment.

In one example, as shown in FIG. 11, the controller 80 starts the intrusion determination process which determines the intruding state when the object enters into the intrusion detection area (Step S4-1). In Step S4-1, the object entering into the intrusion detection area in the detection area DA1 is considered to be the part of the body of the user U, the belongings of the user U, or the clothes of the user U, and the object entering into the intrusion detection area in the detection area DA2 is considered to be the luggage B placed on the luggage carrier 42.

In Step S4-1, when the object is in the intrusion detection area for longer than a predetermined period of time, it is determines as the intruding state. The predetermined period of time is longer than a few seconds, for example. A few seconds is 2 seconds, 5 seconds, or the like. This prevents intrusion counter process in Step S4-2, which will be described below, from being performed at an unnecessary frequency. Also, in Step S4-1, it may be possible to determine the intruding state soon after the object enters into the intrusion determination area.

In Step 4-1, when the intruding state is determined, the controller 80 performs the intrusion counter process (Step S4-2). The intrusion counter process is a notification process which performs notification by using the notification device provided in the electric mobility vehicle M, and a process which changes the traveling state of the electric mobility vehicle M by controlling the motors MT. In one example, in Step S4-2, both the notification process and the process which changes the traveling state are performed.

Examples of the notification include a predetermined display on the display 200, output of predetermined sound or voice using the voice/sound generating device 300, predetermined light emission using the light emission portion 400 provided in the mobility body 30, or the like. In this embodiment, as shown in FIG. 1, the light emission portion 400 is provided in the front end of a control arm 43. More specifically, the light emission portion 400 is provided in a position located at the front end and in the upper end side of the control arm 43. The controller 80 makes the light emission portion 400 emit the light in a first color, such as blue, green, white, or the like, when the electric mobility vehicle M performs normal traveling where the evading operation is not performed, and the controller 80 makes the light emission portion 400 emit the light in a second color, such as yellow, red, or the like when the electric mobility vehicle M is in the evading operation. At the time of the notification, the controller 80 makes the light emission portion 400 emit light in a third color which is the color different from that at the time of the normal traveling and of the evading operation. For example, the controller 80 makes the light emission portion 400 emit light in purple. The controller 80 may make the light emission portion 400 emit light in a manner different from that at the time of the normal traveling and the evading operation. For example, the controller 80 may make the light emission portion 400 flash the light for the notification purpose.

Figure 12:
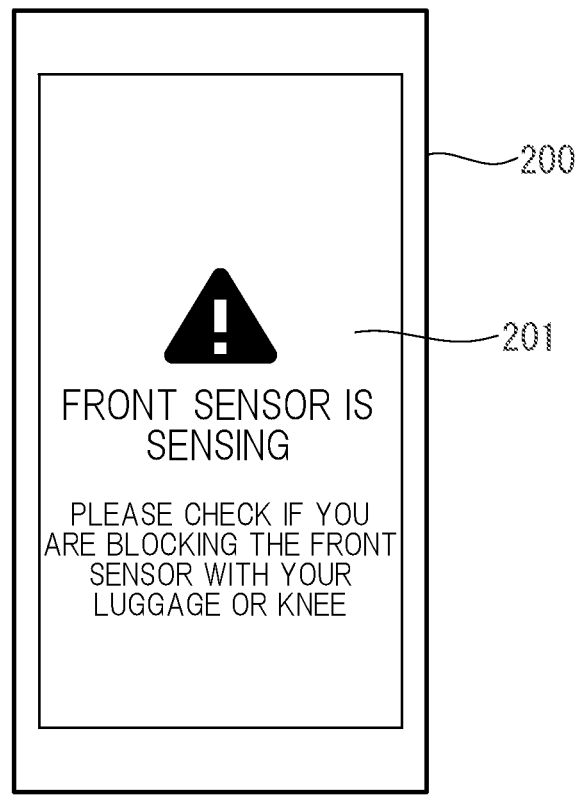
FIG. 12 is a diagram showing an example of a display screen displayed on a display of the electric mobility vehicle of the embodiment.
Figure 13:
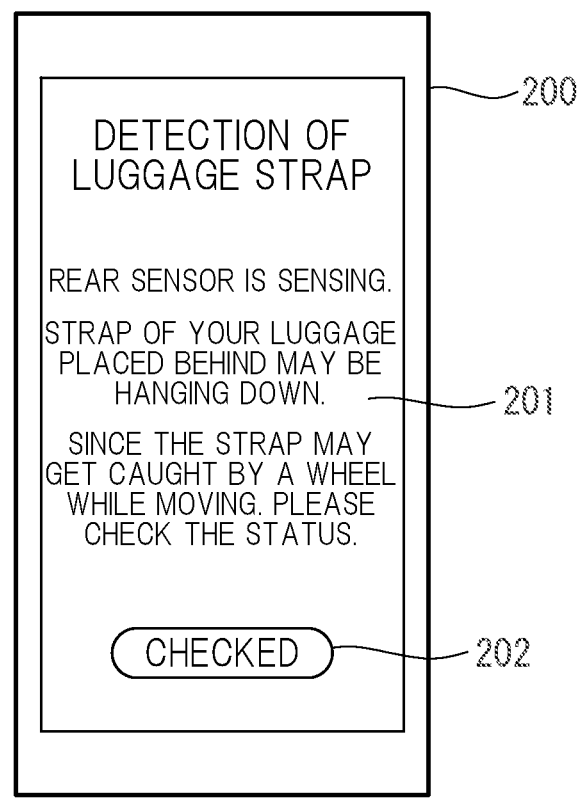
FIG. 13 is a diagram showing an example of a display screen displayed on the display of the electric mobility vehicle of the embodiment.

As a predetermined display on the display 200, the controller 80 shows displays which are shown in FIGS. 12, 13, or the like on the display 200. FIG. 12 is a display which is shown when the intruding state (a first intruding state) is determined in the intrusion detection area in the detection area DA1, and FIG. 13 is a display which is shown when the intruding state (a second intruding state) is determined in the intrusion detection area in the detection area DA 2. By changing what is displayed on the display 200 in accordance with each of the sensors, it becomes easy for the user U to grasp the situation, which can improve the situation at an early stage. In this embodiment, the display in the FIG. 12 works as a first notice, and the display in the FIG. 13 works as a second notice, however, it is possible to change the sound or the voice used for the first notification and the second notification.

Also, as shown in FIG. 13, when notifying the intrusion, a button 202 which requesting the user U to operate may be appeared on the display 200. The controller 80 determines that the user U is aware of the intruding state, when the button 202 is operated.

Examples of the change of the traveling state include stopping the electric mobility vehicle M, reducing the traveling speed of the electric mobility vehicle M, stopping the electric mobility vehicle M after reducing the traveling speed for a predetermined period of time, and the like.

For example, the controller 80 reduces the maximum traveling speed so as to be less than 4 km/h so that the electrical mobility vehicle M is in a deceleration state. It is preferable that the maximum traveling speed is less than 3.5 km/h, and less than 2 km/h is more preferable. It is also possible that the controller 80 reduces rotation speed of the motors MT with respect to an operation amount of the operation lever 44a of the operation portion 44 by a predetermined ratio so that the electric mobility vehicle M travels in the deceleration state. In these cases, the electric mobility vehicle M does not move at high speed even when the operation lever 44a is operated largely. This configuration is useful for securing safety of person around the electric mobility vehicle M and safety of the user U.

In one example, in Step S4-2, the controller 80 changes the traveling state after giving the notification. That is to say, the controller 80 changes the traveling state a few seconds after the notification is given. Due to this, the user U can have time for preparation before the electrical mobility vehicle M reduces its speed or stops.

In another example, in Step S4-2, one of the notification process and changing of the traveling state is performed.

Step S4-2 is executable in accordance with various process examples which are described below.

In a first process example, when the intrusion is determined in Step S4-1 at the time when the electric mobility vehicle M is moving by operating the operation lever 44a, the controller 80 gives the notification in Step 4-2, however, the movement of the electric mobility vehicle M on the basis of the operation by using the operation lever 44a is sustained. In this case, the user U can solve the intruding state in the detection areas DA1, DA2, in such a state where the electric mobility vehicle M is moving. This process is useful for improving comfortability of the user U.

In a second process example, when the intrusion is determined in Step S4-1 at the time when the electric mobility vehicle M is moving by operating the operation lever 44a, the controller 80 gives the notification in Step 4-2, and, the movement of the electric mobility vehicle M on the basis of the operation by using the operation lever 44a is sustained, while reducing the traveling speed. In this case also, the user U can solve the intruding state in the detection areas DA1, DA2, in such a state where the electric mobility vehicle M is moving while reducing the traveling speed. This process is advantageous for improving comfortability of the user U, and also advantageous for securing the safety of the person around the electric mobility vehicle M and the user U.

In a third process example, when it is determined that the electric mobility vehicle M is intruding in Step S4-1 at the time when the electric mobility vehicle M is moving by the automatic driving as described above, the controller 80 gives the notification in Step 4-2, however, the movement of the electric mobility vehicle M on the basis of the operation by using the operation lever 44a is sustained. In this case, the user U can take much more time and pay much more attention to solve the intruding state in comparison with the manual driving. Therefore, this process is advantageous for improving comfortability of the user in the automatic driving.

In a fourth process example, when the intrusion is determined in Step S4-1 at the time when the electric mobility vehicle M is moving by the automatic driving as described above, the controller 80 gives the notification in Step 4-2, and, the movement of the electric mobility vehicle M on the basis of the operation by using the operation lever 44a is sustained while reducing the traveling speed. In this case also, the user U can take much more time and pay much more attention to solve the intruding state in comparison with the manual driving. This process is advantageous for improving comfortability of the user U, and also advantageous for securing the safety of the person around the electric mobility vehicle M and the user U.

Also, in the first to the fourth process examples, it is possible to change the notification in Step S4-2 for each of the times when the intrusion into the detection area DA1 is determined and when the intrusion into the detection area DA2 is determined. By changing the notification for each of the sensors, it becomes easy for the user U to grasp the situation. This process is advantageous for the user U to achieve quick response to the display described in Step S4-2.

Also, in Step S4-1, when it is determined that the intruding state is not determined, the controller 80 may make the notification that the electric mobility vehicle is not in the intruding state. For example, the controller 80 shows that the electric mobility vehicle M is not in the intruding state by using the display 200, the voice/sound generating device 300, the light emission portion 400, or the like. By this notification, the user U can know successively, or at a fixed interval that the detection areas DA1, DA2 are not interrupted.

Also, when the intrusion sate is notified in the Step S4-2, the controller 80 may notify degree of the intrusion. For example, the controller 80 notifies the degree of the intrusion by using the display 200, the voice/sound generating device 300, the light emission portion 400, or the like. The degree of intrusion may be indicated by a numeral value by using a unit, such as cm, inch, or the like. Because of the notification, the user U can take more appropriate response so as to solve the intruding state.

Also, in Step S4-2, when the intruding state is notified, a means to solve the intruding state may be notified. For example, the controller 80 requests the user U to move his/her knees toward the inside in the width direction by using the display 200, the voice/sound generating device 300, the light emission portion 400, or the like.

Also, in Step S4-1, when the object occupies an area larger than a threshold in the intrusion detection area, it may be determined that the electric mobility vehicle M is in the intruding state. For example, when the object occupies an area larger than 20% of the intrusion detection area, the intruding state is determined. In this case, the electric mobility vehicle M does not give the notification, or does not change the traveling state in a useless manner in a state where the little intrusion is made, which leads to the comfortable ride of the electric mobility vehicle M.

Also, in Step S4-1, in a case where the detected object does not move in response to the movement of the electric mobility vehicle M, the controller 80 may recognize that the object is the part of the body of the user U, something worn by the user U, or the luggage B placed on the luggage carrier 42. The objects around the electric mobility vehicle M detected in the detection areas DA1, DA2 move in response to the movement of the electric mobility vehicle M. Whereas, the part of the body of the user U, something worn by the user U, or the luggage B placed on the luggage carrier 42 does not move in response to the movement of the electric mobility vehicle M in the detection areas DA1, DA2. This configuration is useful for reducing the notification and the changing of the traveling state from being performed in a useless manner, and is also useful for accurately recognizing the object preventing the detection areas DA1, DA2.

Also, in Step S4-1, the controller 80 may estimate the objects which are intruding into the intrusion detection area, and the controller 80 may displays letters, figures, or the like which show the objects estimated in Step S4-2. For example, various images of the knees of the user U are stored in the storage unit 82, and the controller 80 can determine that the object which is intruding into the intrusion detection area is a knee on the basis of the images. Various kinds of images such as a static image, a moving image, a set of feature points, or the like can be used. Moreover, determination based on the images, and collection and recognition of the images may be performed by using a known learning function, a known semantic segmentation technique, or the like.

In this embodiment, information of whether or not the part of the body, the belongings, something worn by the user U, or the luggage B placed on the luggage carrier 42 enters into the determination areas DA1, DA2 of the stereo cameras 90 or the LiDAR 95 is shown on the management table of FIG. 9. The information displayed on the management table is extremely useful for the provider of the service to determine whether or not the user U needs assistance.

Also, in this embodiment, information of whether the intruding state or not is displayed on the management table of FIG. 9, together with the detected result of the seating sensor 53. This configuration is useful for determining the state of the user U or that of the electric mobility vehicle M when it is displayed that the intrusion is being made. In one example, at the time of the automatic returning in Step 5, when the detected result of the seating sensor 53 is NO, and the intrusion in the detection area DA1 is determined, the provider of the service can determine that it is not normal. For example, the above described state occurs when the detected result of the seating sensor 53 is NO because of a paper box or a bag placed on the seating unit S, and when the box or the bag is intruding into the detection area DA. There is a possibility that the above described state occurs when a lens or the like of the stereo cameras 90 has a problem.

Also, in this embodiment, information of whether the intruding state or not is shown in the management table of FIG. 9, together with the detected result of the occupancy sensor 49. This configuration is useful for determining the state of the user U or that of the electric mobility M at the time when it is displayed that the intrusion is being made. In one example, when the user U does not place the luggage B on the luggage carrier 42, but a part of the clothes of the user U, such as a scarf or the like, enters into the detection area DA of the LiDAR 95, the detected result of the occupancy sensor 49 becomes NO, and the intrusion into the detection area DA2 is determined. When this state continues, there is a possibility that the scarf is caught by the rear wheel 20. The provider of the service can find this kind of abnormality at an early stage. When the occupancy sensor 49 or the LiDAR 95 has a problem, the above described situation can occur.

Further, the management table of FIG. 9 also has the information of the traveling state or the usage information of the electric mobility vehicle M. The information is useful for the provider of the service to detect the abnormality at an early stage.

Also, in FIG. 9, instead of the information of whether or not the electric mobility vehicle M is in the intruding state, information of whether or not the traveling state of the electric mobility vehicle M is changed may be shown. This information is extremely useful for the provider of the service to detect the abnormality at an early stage.

In one example, in the management table, when the electric mobility vehicle M is moving by the operation by using the operation lever 44a, it can be considered that the electric mobility vehicle M is in the decelerated traveling state, and the traveling state is manual driving. From this information, it can be considered that the speed of the electric mobility vehicle M is reduced because the intrusion is made in the detection areas DA1, DA2. On the basis of the information of the traveling state, the provider of the service can know whether the electric mobility vehicle M is driven manually or automatically. This information is useful for determining a priority order for sending the assistant to the electric mobility vehicle M.

Also, as shown in FIG. 9, the management table includes information of elapsed time since the intrusion is made. This information is extremely useful for the provider of the service to detect the abnormality at an early stage. Also, there is a case where the management table includes information of elapsed time since the traveling state is changed. This information is also extremely useful for detecting the abnormality at an early stage. When a long time has passed since the intrusion is made or the traveling state is changed, the provider of the service can provide the assistant so as to help the user U of the electric mobility vehicle M.

Moreover, it is preferable that at last one of the information of destination and the information of desired arrival time of the user U are included in the management table. The information is useful for the provider of the service to make accurate determination of sending the assistant. For example, in such a condition where the desired arrival time of the user U is approaching, and when the intrusion is made for a plurality of times or the intrusion has been made for a long period of time, it is highly necessary to send the assistant.

In Step S5, which is the automatic returning step, the management computer 100 or the controller 80 determines whether or not a returning operation of the automatic mobility vehicle M can be started by the automatic driving mode after the user U left. The provider of the service may determine whether or not the returning operation of the automatic mobility vehicle M can be started by looking at the displays 103, 5, or the like of the management compute 100, and may input the determination result into the management computer 100.

The automatic returning operation is started on the basis of the determination result, and the electric mobility vehicle M arrives at a return target position, such as the management station 2, for example.

In Step S6, which is a post-processing step, the provider of the service moves the plurality of electric mobility vehicles M placed at the management station 2 to a storage space, such as a warehouse or the like.

In the above described operation and the other operation, the user U can communicate, chat, or the like with the provider of the service via the display 200 or the like by operating the display 200 or the setting portion 45 at a time when the user U is on the electric mobility vehicle M. This configuration contributes to give a sense of security to the user U, to prevent the user U from wrongly using the electric mobility vehicle M, or the like. Due to the configuration, the provider of the service can inform solutions to the user U having a problem, such as the notification in Step S4-2 is repeatedly notified or the like.

Also, in the above embodiment, the occupancy sensor 49 may detect not only objects placed on the luggage carrier 42, but also objects placed on the other luggage carrier of the electric mobility vehicle M and objects placed on the seating unit S. For example, when the visual sensor, which is the occupancy sensor 49, is supported above the luggage carrier 42 by a supporting member, such as a pole or the like, the luggage carrier 42 and the seating unit S are placed in the detection area of the visual sensor. In this case, the visual sensor captures images of luggage which is placed on the seating unit U by the user U, and stores them to the storage unit.

When the seating unit S is placed in the detection area of the occupancy sensor 49, the occupancy sensor 49 also works as the seating sensor 53.

Moreover, the service using the electric mobility vehicle M may be provided in facilities other than the airport terminals T. For example, the service can be provided in facilities, such as hospitals, train stations, or the like. Also, the service may be provided at open-air facilities, such as amusement parks, open-air museums, universities, concept towns, or the like. In the above described operation, a plurality of standby places may be provided. For example, the standby places may be provided at positions corresponding to each gate. Also, when the user U finishes using the electric mobility vehicle M, the electric mobility vehicle M may find a place where the electric mobility vehicle M can stay, and the found place may be used as the standby position. Examples of the place where the electric mobility vehicle can stay include a space besides a wall or the like.

Figure 14:
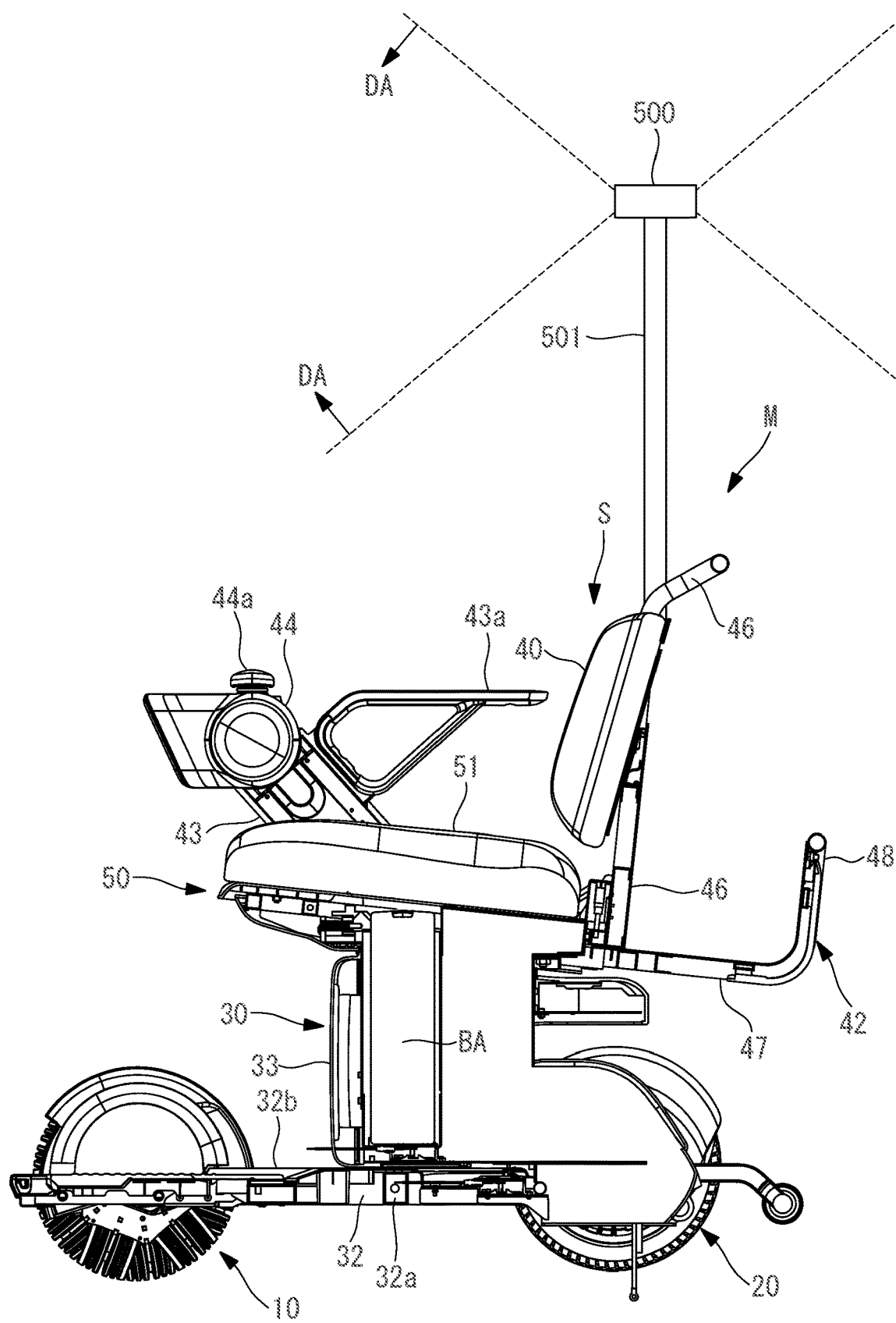
FIG. 14 is a cross-sectional view of an electric mobility vehicle according to a first modified example of the embodiment.

In this embodiment, the stereo cameras 90 are provided as sensors at a front end of the control arms 43 or the arm rests 43a, and the LiDAR 95 is provided as a sensor at the rear end portion of the seating unit S or under the luggage carrier 42. Instead of this, as shown in FIG. 14, a known three-dimensional LiDAR 500 may be placed above the seating unit S. The three-dimensional LiDAR 500 is, for example, fixed at an upper end of a pole 501 provided at the mobility body 30. For a detection area DA of the three-dimensional LiDAR 500, the controller 80 can also determine the intruding state as described above. That is to say, the notification and creation of the management data is also performed as described above, and those are performed for the examples shown in FIGS. 15 to 18 as well. Also, it is considered that a head of the user U, a hat worn by the user U, a hoodie, belongings of the user U, or the like often enters into the detection area of the LiDAR 500.

Also, the electric mobility vehicle M in this embodiment is a kind of an electric wheelchair vehicle having a seat unit on which a single user U is to be seated to ride, however, it can be considered that there is a case where a ride base is provided in the rear end portion of the mobility body 30, for example, and a user other than the user U stands on the ride base to ride. In this case, for example, the luggage carrier 42 is smaller in the vehicle front-rear side, and the LiDAR 95 is attached at a lower surface or the like of the ride base. Also, the user riding on the ride base can operate the operation lever 44a or the display 200 so as to move the electric mobility vehicle M manually or automatically. As described above, even in such a case where the user U and the user ride on the electric mobility vehicle M, the controller 80 can determine the intruding state, which is the same as or similar to the above described ones, in the detection areas DA1, DA2 of the each sensor. Also, the controller 80 is capable of notifying and changing the traveling state, which are the same as or similar to those described above, and therefore, the same or similar effect as described above can be obtained.

Figure 15:
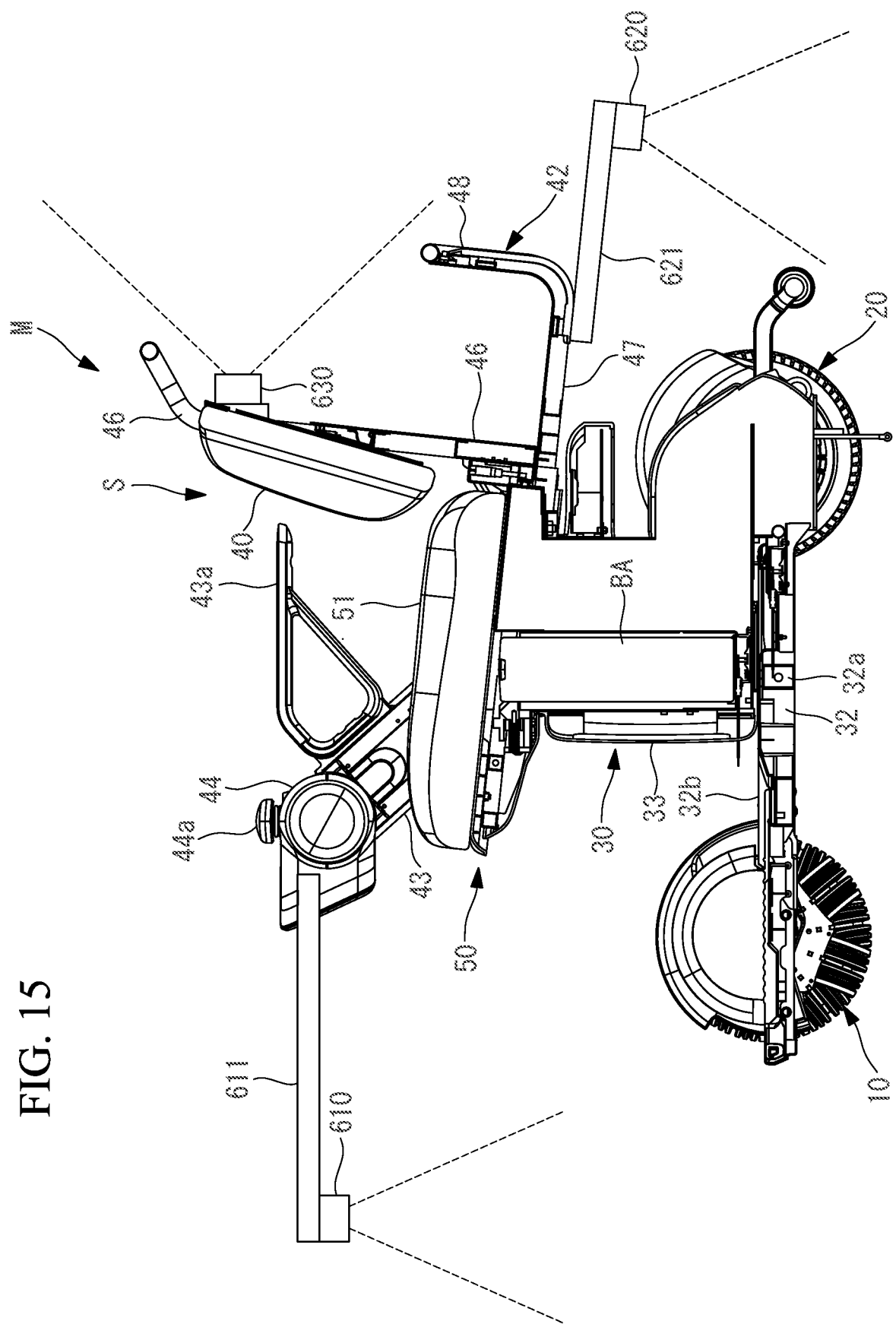
FIG. 15 is a cross-sectional view of an electric mobility vehicle according to a second modified example of the embodiment.

Also, as shown in FIG. 15, a front end side sensor 610 which is fixed to a frame 611 extending from the control arm 43 toward the front side, and a rear end side sensor 620 which is fixed to a frame 621 extending from the rear end portion of the mobility body 30 toward the rear side may be provided. In FIG. 15, a back surface side sensor 630 are provided at the back surface of the seating unit S. Each of the sensors 610, 620, 630 can be a two-dimensional camera, a three-dimensional camera, a three-dimensional distance sensor, or the like. The controller 80 can determine the intruding state, which is same as or similar to the above described ones, in the detection areas of each of the sensors 610, 620, 630.

Figure 16:
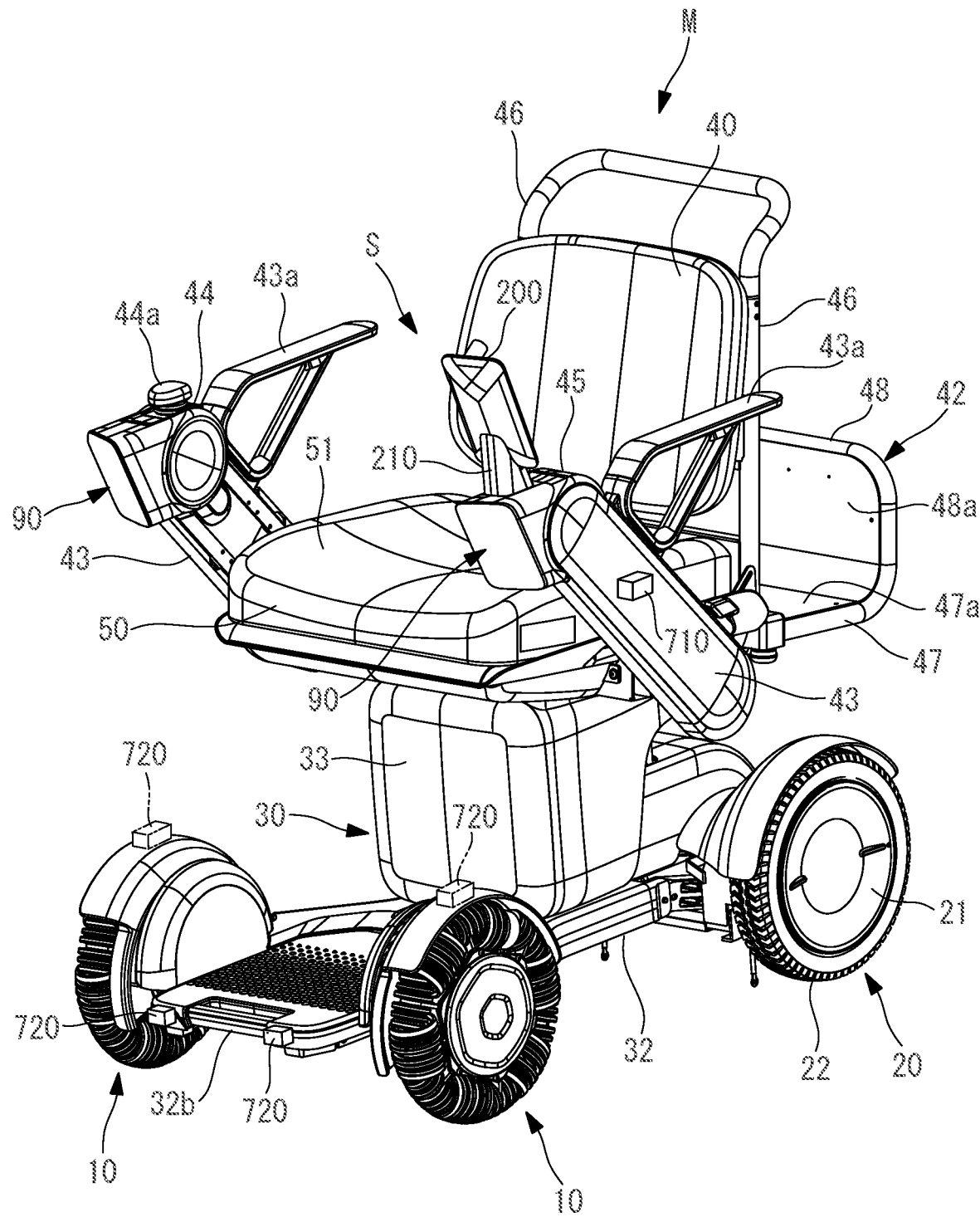
FIG. 16 is a cross-sectional view of an electric mobility vehicle according to a third modified example of the embodiment.

Also, as shown in FIG. 16, sensors 710 may respectively be provided at both side surfaces of the pair of control arms 43, and a pair of sensors 720 in the width direction may be provided in the front end portion of the mobility body 30. The sensors 710, 720 can be a three-dimensional camera, a three-dimensional distance sensor, a three-dimensional LiDAR, or the like. The controller 80 can determine the intruding state, which is the same as or similar to the above described ones, in the detection area of each of the sensors 710, 720 as well. Also, as shown by a two dotted line in FIG. 16, the pair of sensors 720 may be provided above the pair of front wheels. In this case also, the controller 80 can determine the intruding state, which is the same as or similar to the above described ones, in the detection area of each of the sensors 720 as well.

Figure 17:
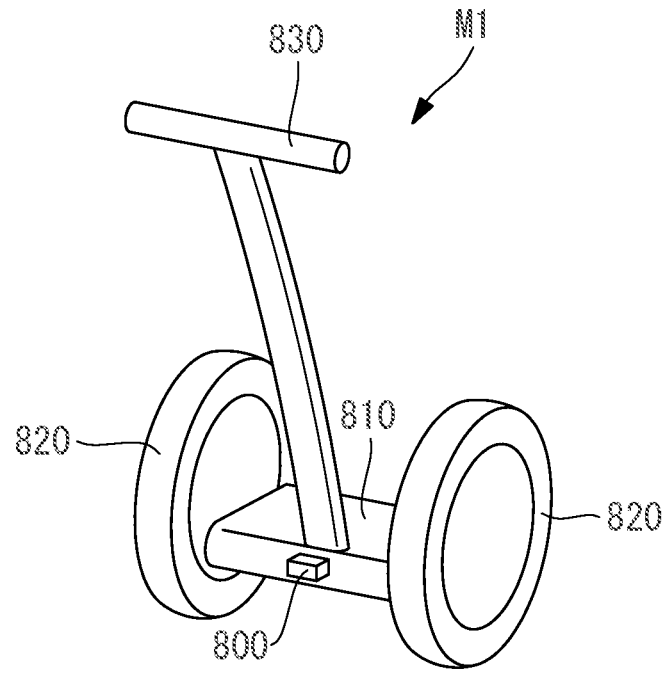
FIG. 17 is a perspective view of an electric mobility vehicle according to a fourth modified example of the embodiment.

Also, as shown in FIG. 17, in a sensor 800 which is provided in an electric mobility vehicle M1 which is different from the above described embodiment, a controller of the electric mobility vehicle M1 can determine the intruding state, which is the same as or similar to the above described ones, and can notify and change traveling state which are the same as or similar to those described above. The electric mobility vehicle M1 in FIG. 17, on which one person is to ride, includes a ride base 810 on which the user is to stand to ride, a pair of wheels 820 supporting the ride base 810, and a grip portion 830 which extends upwardly from the ride base 810, and which is grabbed by the user. Also, the electric mobility vehicle M1 in FIG. 17 has motors for driving each of the pair of wheels 820, and which is the same as or similar to the motors MT in the above described embodiment, and a controller for driving the motors which is the same as or similar to the controller 80 in the above described embodiment. A mobility body of the electric mobility vehicle M1 has the ride base 810, the wheels 820, the grip portion 830, the motors, and the controller.

When the ride base 810 is tilted by the user, the electric mobility vehicle M1 in FIG. 17 controls the motors so that the electric mobility vehicle M1 moves toward a direction in which the ride base 810 is tilted. That is to say, the electric mobility vehicle M1 is for one person to ride and also to operate.

Also, based on a detected result of the sensor 800, the controller reduces rotation speed of the motors (evading operation) or stops (automatic stop) the motors so as to avoid the object to be avoided.

The sensor 800 can be a three-dimensional camera, a three-dimensional sensor, a LiDAR, or the like. A notification device, which is the voice/sound generating device and a display, which are the same as or similar to the voice/sound generating device 300 and the display 200 in the above described embodiment, is provided in the ride base 810, the grip portion 830, and the like, and the controller uses the notification device for giving notification which is the same as or similar to that in the above described embodiment.

Figure 18:
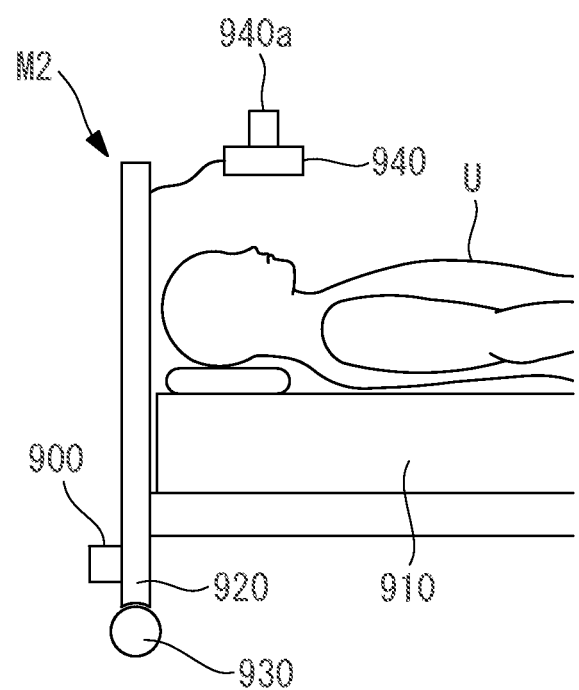
FIG. 18 is a side surface view of an electric mobility vehicle according to a fifth modified example of the embodiment.

Also, as shown in FIG. 18, with a sensor 900 which is provided in an electric mobility vehicle M2 which is a further different type from the electric mobility vehicle M, a controller of the electric mobility vehicle M2 may determine the intruding state in a manner which is the same as or similar to the above described ones, and gives notification and changes the traveling state in a manner which is the same as or similar to the above described ones. The electric mobility vehicle M2 in FIG. 18 is basically for a single user U to ride, and the electric mobility vehicle M2 includes a bed portion 910 on which the user U is to ride, a plurality of leg portions 920 extending from the bed portion 910 downwardly, and wheels 930 provided in a lower end of each of the leg portions 920. The electric mobility vehicle M2 in FIG. 18 has an operation lever 940 for operation which is the same as or similar to the motors MT in the above described embodiment. Also, the electric mobility vehicle M2 in FIG. 18 has motors which respectively control some of the wheels 930, and which are the same as or similar to the motors MT in the above described embodiment, and a controller which is for controlling the motors, and which is the same as or similar to the controller 80. A mobility body of the electric mobility vehicle M2 has the bed portion 910, the leg portions 920, the wheels 930, the operation lever 940, the motors, and the controller. There is also a case where the electric mobility vehicle M2 is referred to as a bed with an automatic transferring function.

In the electric mobility M1 in FIG. 18, when the user U on the bed portion 910 controls a control portion 940a of the operation lever 940, the controller controls the motors so that the electric mobility vehicle M2 moves in a direction operated by the control portion 940a. That is to say, the electric mobility vehicle M2 can be ride by a single user U, and at the same time, operated by the user U. Also, the operation portion 940a may be operated by an operator other than the user U on the bed portion 910. In this case, the electric mobility vehicle M2 moves by operation of the other operator. Moreover, in such a case where the controller has the above described automatic driving program 82c, the controller controls the motors so that the electric mobility vehicle M2 moves automatically to a destination input by the user U or the other operator by using the input device, such as the operation lever 940 or the like.

Further, the controller reduces rotation speeds of the motors (evading operation) or stops the motors (automatic stop) so as to avoid the objects to be avoided on the basis of a detected result of the sensor 900.

The sensor 900 can be a three-dimensional camera, a three-dimensional distance sensor, a LiDAR, or the like. A notification device, which is a voice/sound generating device and a display which are the same as and similar to the voice/sound generating device 300 and the display 200 in the above described embodiment, is provided in the bed portion 910, the leg portions 920, or the like, and the controller uses the notification device to give notification which is the same as or similar to that in the above described embodiment.

Figure 19:
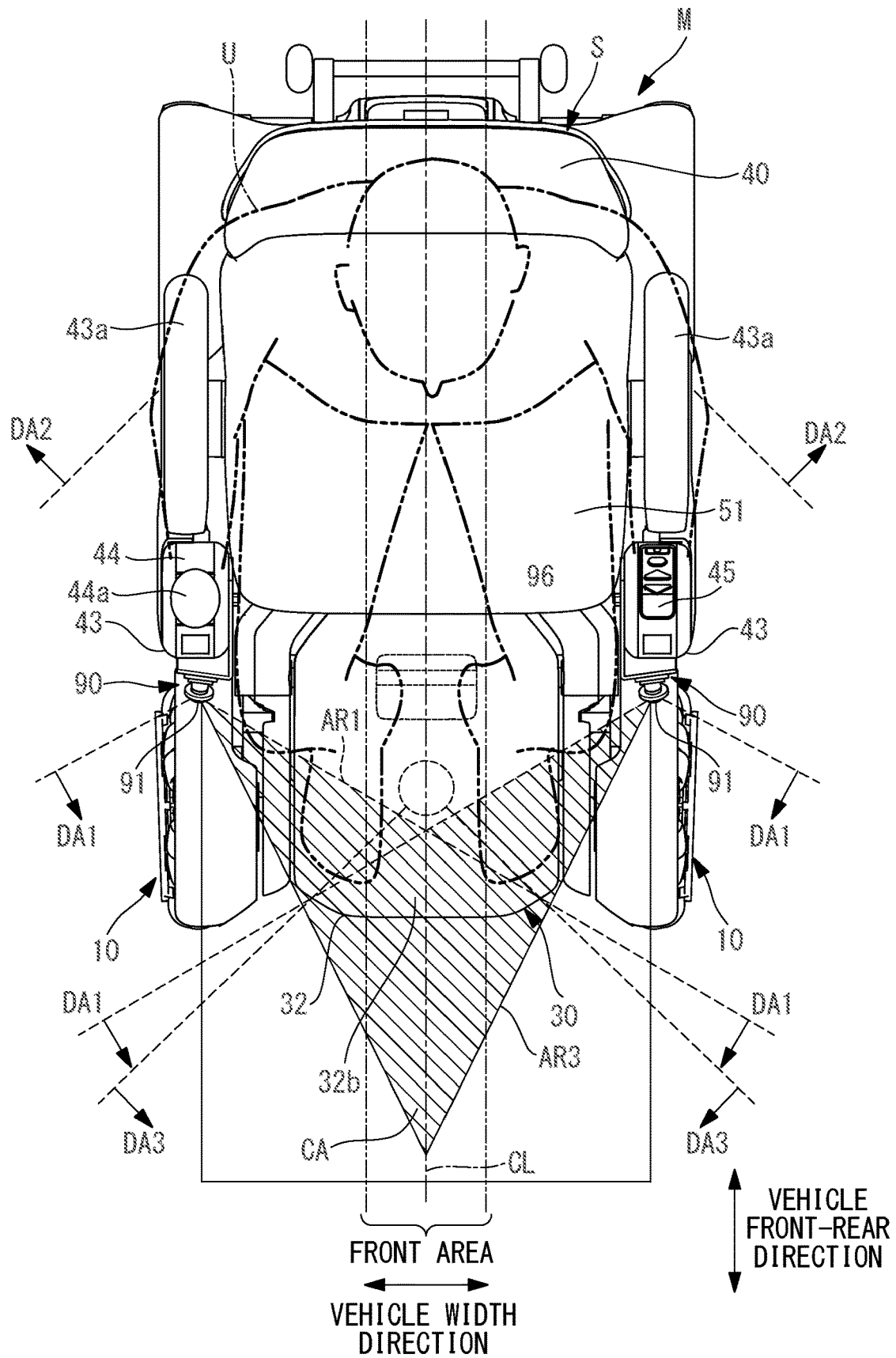
FIG. 19 is a plan view of the electric mobility vehicle of the embodiment.

In FIG. 10, as described above, when the alternative candidate area AR3 is set as the intrusion detection area, for example, as shown in FIG. 19, a difference area, which is between the original intrusion detection area AR1 and the alternative candidate area AR3, is regarded as a detection cancel area CA. In FIG. 19, the difference area is shown by using oblique lines, and the difference area is also the detection cancel area CA. The detection cancel area CA is an area within the detection area DA1 where the part of the body, the part of the clothes, or the part of the belongings of the user U can exist, but not determined as the intruding state.

In FIG. 19, an end located at the user U side in the alternative candidate area AR3 (an end located at the rear side of the vehicle) is located at a front side than that in the case in FIG. 10. When the alternative candidate area AR3 is set as the intrusion detection area, in the area located in front of the user U who is seated on the seating unit S, the detection cancel area CA where the part of the body, the part of the clothes, or the part of the belongings of the user U, or the like can exist, becomes larger.

In FIGS. 10, 19, after changing the detected data obtained by the stereo cameras 90 into a two-dimensional plan view images, the detection cancel area CA is set as non-detection area in the plan view images. Or, in the data in the three-dimensional area, which is the detected data, the detection cancel area CA is set as the non-detection area. It is also possible to set the detection cancel area CA by setting the controller 80 not to recognize a part of the detection area DA1. It is also possible to set the detection cancel area CA by using the other known method.

Figure 20:
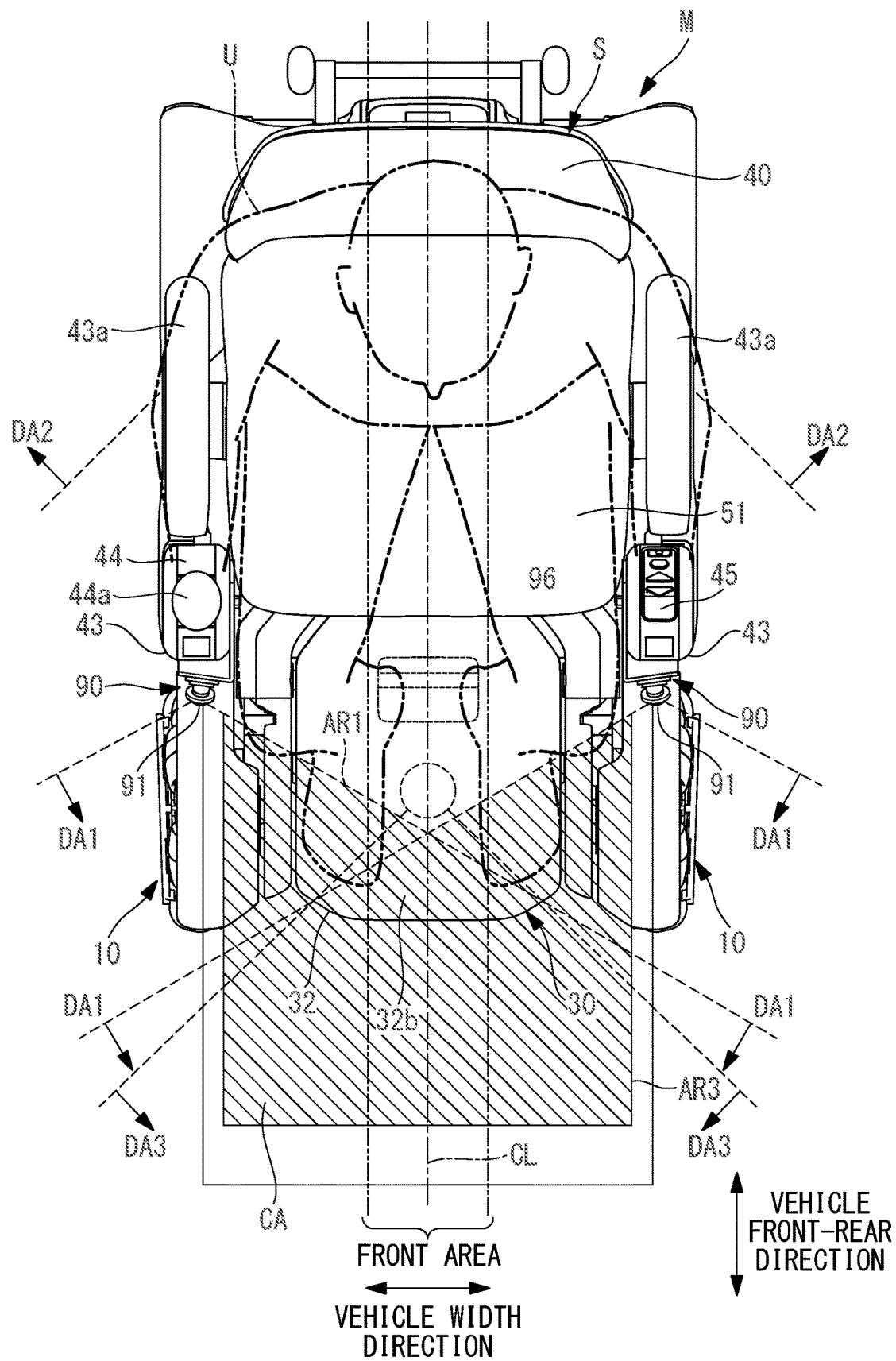
FIG. 20 is a plan view of the electric mobility vehicle of the embodiment.

It is possible to set an area in front of the user U as the detection cancel area CA, as shown in FIG. 20. In FIG. 20 also, the detection cancel area CA is an area shown by using the oblique line. As to the detection area DA 2 of the LiDAR, the detection cancel area CA can be set, which is the same as or similar to the case of the detection area DA1.

The detection cancel area CA, which is set as shown in FIGS. 10, 19, 20, or the like, is adjustable in the front-rear direction of the mobility body 30 as described above. For example, as described above, when the plurality of alternative candidate areas AR2, AR3 are displayed on the display 200, and the alternative candidate area AR2 is chosen, the detection cancel area CA is adjusted in the front-rear direction of the mobility body 30. Each user U has different shape, height, clothes, and the like. In such a case where a back of the user U is bent and has long legs, the knees of the user U may protrude toward the front side than the front end of the electric mobility vehicle M. Also, there is a case where the clothes of the user U largely intrudes into the detection area DA1 of the stereo cameras 90. As described above, making the detection cancel area CA adjustable is extremely useful for stably providing sharing service of the electric mobility vehicle M.

Here, the area in front of the user U is, for example, as shown in FIGS. 19, 20, an area whose width is 20 cm or the like, where the central line CL of the mobility body 30 or the seating unit S in the width direction and the central line corresponds to each other. As shown in FIGS. 19, 20, and the like, the detection cancel area CA is set in an area located in front of the user U. It is not necessary that the entire area of the detection cancel area CA is included in the area located in front of the user U, and the part of the detection cancel area CA may be located at a position outside in the width direction of the area in front of the user U.

Figure 21:
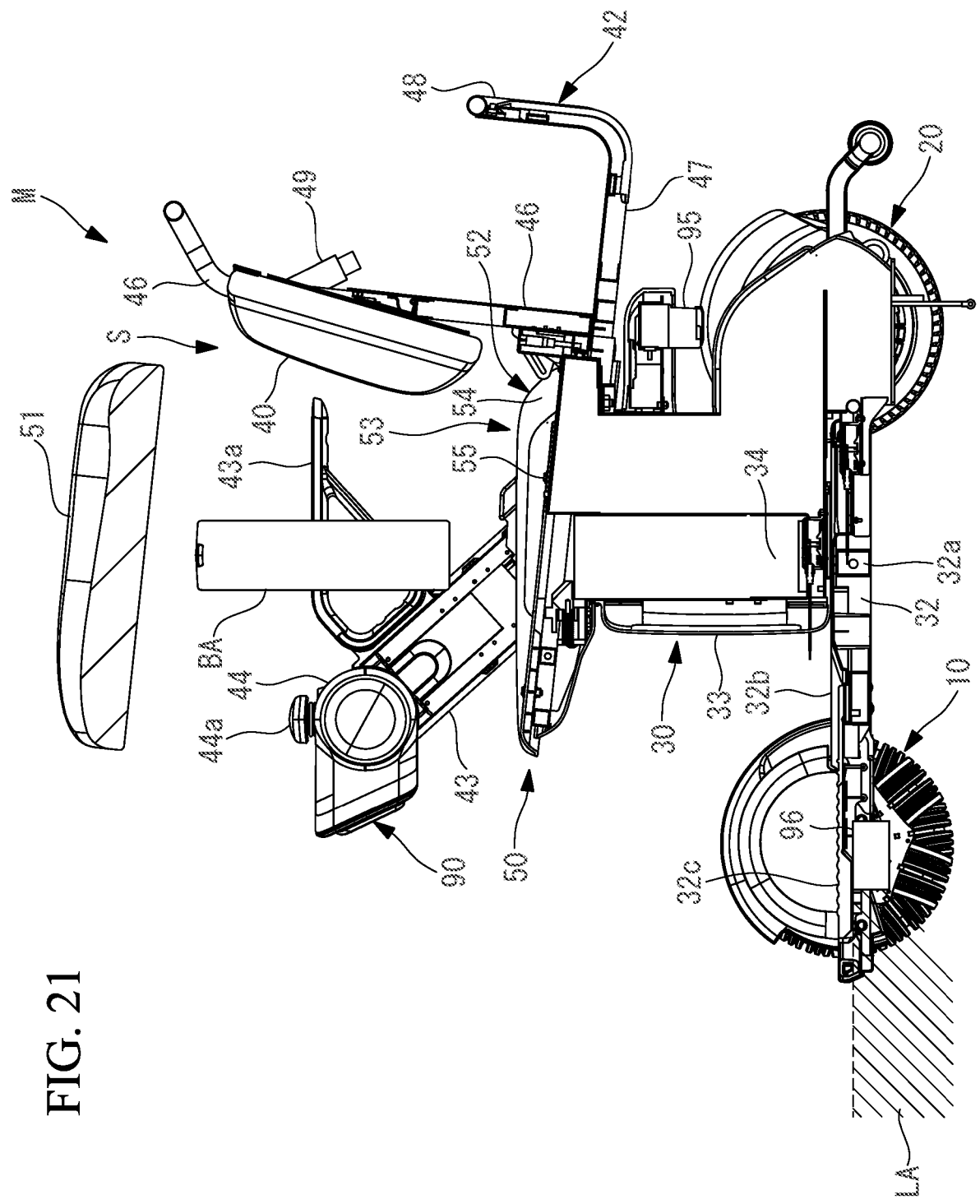
FIG. 21 is an exploded sectional view of a part of the electric mobility vehicle of the embodiment.

As shown in FIGS. 10, 19, 20, and the like, when the detection cancel area CA is set in the area in front of the user U, as shown in FIG. 21, a lower side sensor 96 is attached to the lower surface of the electric mobility vehicle M. As shown in FIG. 6, the lower side sensor 96 is connected to the controller 80. In this embodiment, the lower side sensor 96 is a two-dimensional LiDAR, but it is also possible to use a three-dimensional LiDAR, a radar, a milliwave sensor, or the like. In this embodiment, in the cover portion 32b, the lower side sensor 96 is provided at a position lower than a footrest surface 32c on which the user U seated on the seating unit S places his/her feet.

For example, the lower side sensor 96 scans a laser beam throughout the detection area DA3 shown in FIGS. 19, 20, and the lower side sensor 96 detects the laser beam reflected by the object. That is to say, in a lower side area LA (FIG. 21) of the detection cancel area CA, the lower side sensor 96 detects the objects to be avoided located at a position closer than a predetermined distance (1 m, several tens of centimeters) with respect to the lower side sensor 96. In this embodiment, as shown in FIG. 21, the lower side area LA is an area located lower than the footrest surface 32$c$. Unlike this embodiment, in such a case where a height of the footrest 32$c$ is changed, the lower side area LA may be an area located lower than the highest position of the footrest surface 32$c$. In such a case where the lower side sensor 96 is a three-dimensional LiDAR, a stereo camera, or the like, the lower side sensor 96 may detect the objects to be avoided in the area located lower than the footrest surface 32$c$, and also detects the objects to be avoided in an area located above the footrest surface 32$c$. Also, the lower side sensor 96 may detect the objects to be avoided located outside in the width direction of the front area shown in FIGS. 19, 20.

With this structure, for example, it is impossible to prevent the clothes, such as a skits or the like, from entering into the detection area DA1 of the stereo cameras 90, therefore, in such a state where the detection cancel area CA is set in front of the user U, the lower side sensor 96 detects the object to be avoided from under the footrest surface 32$c$. That is to say, the lower side sensor 96 detects the objects to be avoided in the lower side area LA. Especially, in such a case where the detection cancel area CA is located at the front side relative to the electric mobility vehicle M or the footrest surface 32$c$, the lower side sensor 96 detects the objects to be avoided in the lower side area LA from under the footrest surface 32$c$.

Also, the controller 80 makes the electric mobility vehicle M control the motors MT so as to perform the evading operation when the object to be avoided is detected. Examples of the evading operation include reducing the rotation speed of the motors MT, stopping the rotation of the motors MT (automatic stop function), controlling the motors MT so as to restrict the movement of the electric mobility vehicle toward the side of the object to be avoided, or the like. Therefore, in such a case where the clothes like a skirt or the like gets under the electric mobility vehicle M unintentionally, it is possible to prevent the clothes like a skirt or the like from being caught by the front wheel 10 or the like, and reduces the possibility of the clothes from being damaged by being caught or the like.

Further, for example, when the user U who is seated manually drives the electric mobility vehicle M so as to move to a table, even though a box, luggage, legs of the table, and the like located under the table are not recognized by the user U, the lower side sensor 96 detects the above described ones as the objects to be avoided. Therefore, even in a state where the detection cancel area CA is set in front of the user U, it is possible to prevent the electric mobility vehicle M or the user U from coming into rough contact with the objects under the table.

Furthermore, by turning the electric mobility vehicle M in a state where the detection cancel area CA is set in front of the user U, even a pole or the like extending in the vertical direction is positioned in the detection cancel area CA, the lower side sensor 96 detects the pole as the object to be avoided. This prevents the electric mobility vehicle M or the user U from coming into rough contact with the pole.

Figure 22:
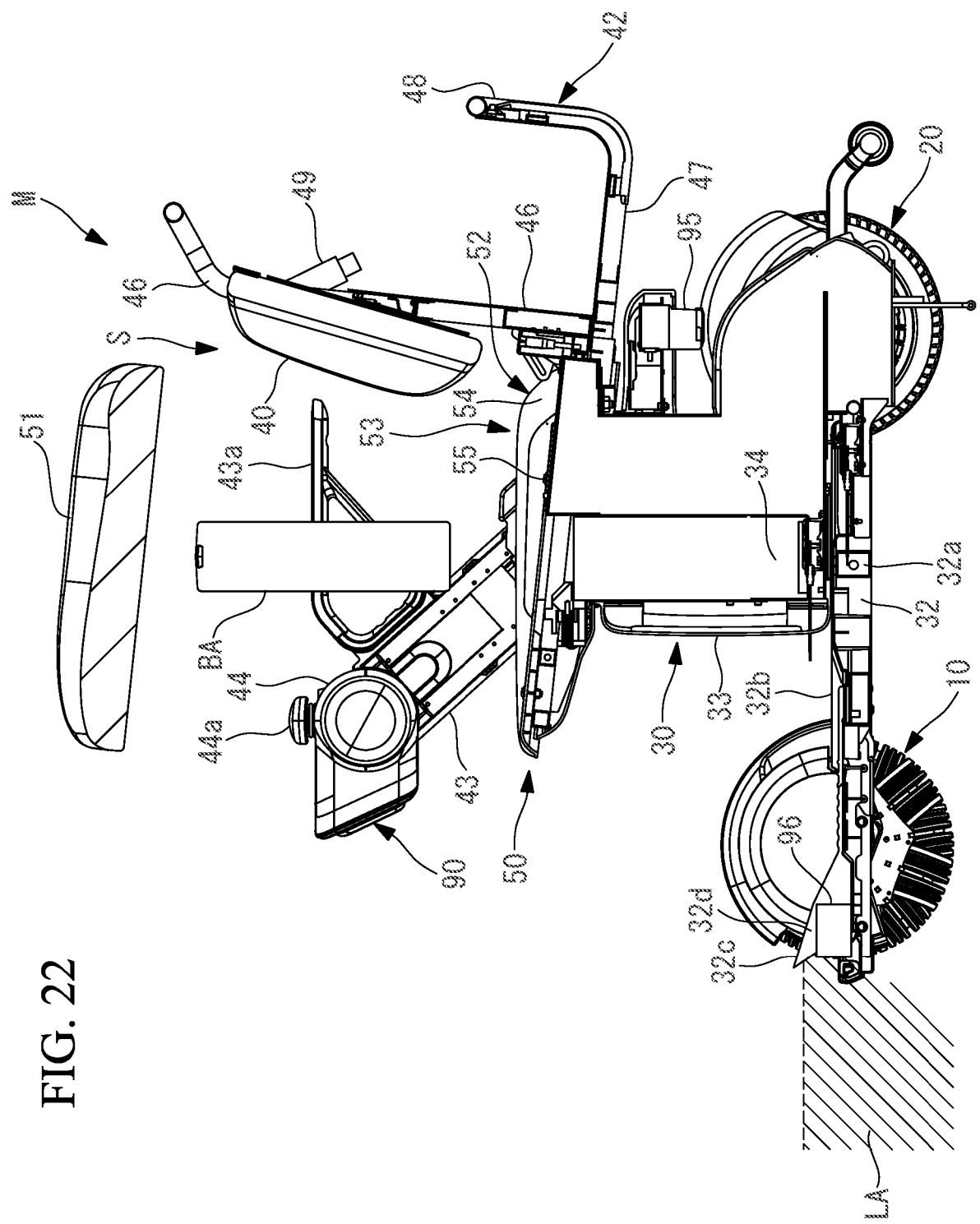
FIG. 22 is an exploded sectional view of a part of the electric mobility vehicle of the embodiment.

As shown in FIG. 22, when the front end portion of a footrest portion 32$d$ protrudes upwardly or the like, the lower side sensor 95 can be placed at the front end portion of the footrest portion 32$d$ of the electric mobility vehicle M, for example. In this case also, the lower side sensor 96 detects the objects to be avoided in the area located at a position lower than the foot rest surface 32, which is as the lower side area LA, from under the foot rest surface 32$c$ and from the front end portion of the foot rest portion 32$d$.

Also, the lower side area LA can be the detection cancel area CA which is an area whose height is lower than 20 cm with respect to a grounding surface of the front wheels 10. When the object to be avoided is detected by the lower side sensor 90 in the lower side area LA, effect which is the same as or similar to the above described ones can be obtained.

Also, there is a case where the footrest surface 32$c$ is formed by a single member or a plurality of shaft members or the like extending in the vehicle width direction. In this case, in a surface of the member, such as the shaft or the like, a portion where the bottom surfaces of the feet of the user U are placed is the footrest surface 32$c$.

Further, in one example, when the seating sensor 53 is YES, the controller 80 controls the motors MT by using the detected data of the lower side sensor 96 so as to control the motors MT for evading operation. Also, when the seating sensor 53 is NO, the controller 80 does not set the detection cancel area CA, or places the detection cancel area CA at a rear position relative to the front end of the electric mobility vehicle M or the front end of the footrest portion. At this time, for example, the controller 80 controls the motors MT by using the detected data of the objects to be avoided obtained by the stereo cameras 90 on the priority basis in comparison with the detected data of the lower side sensor 96, so as to perform the evading operation. By this, it is possible to lower a risk of collision of the electric mobility vehicle M, when the seating sensor 53 is NO.

Moreover, with regard to each of the electric mobility vehicles M, whether or not the object to be avoided is detected by the lower side sensor 96 or whether or not the evading operation for avoiding the object to be avoided is being performed may further be displayed in the management table of FIG. 9. It is often the case that whether or not the problem occur can be determined on the basis of the position information of the electric mobility M, and information that the object to be avoided is detected or that the evading operation is being performed, which are on the management table. The period of time during which the object to be avoided is being detected by the lower side sensor 96 or the like may be displayed on the management table. The time information enables appropriate determination on whether or not the problem is occurring. These configuration is extremely useful for the provider of the service to determine whether or not the user U needs to be assisted.

Also, it is possible to provide the detection cancel area CA without providing the intrusion detection area where intrusion of the part of the body or the like of the user who is seated on the seat unit S is detected. That is to say, the detection cancel area CA is directly provided in the detection areas DA1, DA2. In this case also, in such a state where the detection cancel area CA is set in the area located in front of the user U, when the object to be avoided is detected in the lower side area LA by the lower side sensor 96, effect which is the same as or similar to the above described ones can be obtained.

REFERENCE SIGNS LIST

2 management station (lending counter)
3 reception
4 computer
5 display
10 front wheel
20 rear wheel
30 mobility body
42 luggage carrier 44 operation portion
44a operation lever
45 setting portion (input device)
49 occupancy sensor (visual sensor)
53 seating sensor
60 control unit
80 controller
81 processor
80 storage unit
82b evading operation program
82c automatic driving program
82d luggage presence/absence determination program
82e intruding state determination program
90 stereo camera (first sensor)
95 LiDAR (second sensor)
96 lower side sensor
100 management computer
102 storage unit
102a management data
200 display
201 input device
300 voice/sound generating device
400 light emitting portion
500 three-dimensional LiDAR
610 front end side sensor
620 rear end side sensor
630 back surface side sensor
710, 720, 800, 900 sensor
M, M1, M2 electric mobility vehicle
S seating unit
T airport terminal
CA detection cancel area
LA lower side area

The invention claimed is:

1. An electric mobility vehicle on which a user is to be seated to ride, the electric mobility vehicle comprising:
a mobility body having a wheel, a motor for driving the wheel, and a seat on which the user is to be seated; and
a sensor provided in the mobility body, wherein
the mobility body comprises a controller which controls the motor by using detected data of the sensor for at least one of automatic driving, automatic stopping, or a combination of the automatic driving and the automatic stopping,
the controller is configured to be able to set a detection cancel area, in the detected data,
the sensor provided in the mobility body is constructed and arranged to sense objects in the detection cancel area,
the detection cancel area is set at a front side area of the seat, and includes at least a front-side cancel area located at a front side relative to a footrest portion of the electric mobility vehicle,
the electric mobility vehicle further includes a lower side sensor which is capable of detecting an object to be avoided in a lower side area from under a footrest surface for the user, from a front end portion of the footrest portion, or from under a lower surface of the electric mobility vehicle,
the lower side area includes an area under the front-side cancel area, a lower side of the front-side cancel area, or a combination of the area under the front-side cancel area and the lower side of the front-side cancel area, and
the controller controls the motor for an evading operation when the lower side sensor detects the object to be avoided in the lower side area.

2. The electric mobility vehicle according to claim 1, wherein the detection cancel area is adjustable in a front-rear direction of the mobility body.

3. A system in a facility, the system comprising:
a plurality of the electric mobility vehicles according to claim 1;
a management computer which receives vehicle information of each of the electric mobility vehicles; and
a display which displays the received vehicle information, wherein
the management computer receives information indicating that the object to be avoided is being detected by the lower side sensor or the evading operation is being performed with regard to each of the electric mobility vehicles, and,
with regard to each of the electric mobility vehicles, the display displays based on the information that the object to be avoided is being detected by the lower side sensor or the evading operation is being performed.

4. The electric mobility vehicle according to claim 1, wherein
the controller performs determination process which determines an intrusion state in which luggage placed on a luggage carrier of the electric mobility vehicle is intruding into an area in a detection area of the sensor and outside the detection cancel area based on the detected data of the sensor, while the electric mobility vehicle is moving, and
when the intruding state is determined, the controller performs at least one of notification process using a notification device provided in the electric mobility vehicle or process of changing a travelling state of the electric mobility vehicle by controlling the motor.

5. The electric mobility vehicle according to claim 4, wherein the controller controls the motor so that the electric mobility vehicle is in a decelerated travelling state as the process of changing the traveling state.

6. The electric mobility vehicle according to claim 4, wherein, as the notification process, the controller displays a degree of intrusion of the luggage in the detection area on a display as the notification device.

7. The electric mobility vehicle according to claim 4, wherein, when the intruding state is not determined in the determination process, the controller indicates that the electric mobility vehicle is not in the intruding state by using the notification device.

8. A system in a facility, the system comprising:
a plurality of the electric mobility vehicles according to claim 4;
a management computer which receives vehicle information of each of the plurality of electric mobility vehicles; and
a display which displays the received vehicle information, wherein
with regard to each of the plurality of electric mobility vehicles, the management computer receives information indicating the intruding state or that the process of changing the travelling state is performed due to the intrusion state, and,
with regard to each of the plurality of electric mobility vehicles, the display displays the intruding state or that the process of changing the travelling state is performed based on the information.

9. The system according to claim 8, wherein the display displays an expression which corresponds to elapsed time which has elapsed since the electric mobility vehicle becomes in the intruding state or an expression which corresponds to elapsed time which has elapsed since the changing of the travelling state is performed.

10. The system according to claim 8, wherein, with regard to each of the electric mobility vehicles, the display displays the intruding state or that the process of changing the travelling state is being performed, together with a detected result of a seating sensor provided in the seat.

11. The system according to claim 8, wherein, with regard to each of the electric mobility vehicles, the display displays the intruding state or that the process of changing the travelling state is being performed, together with a detected result of an occupancy sensor which detects presence/absence of luggage on a luggage carrier provided in the mobility body.

12. The electric mobility vehicle according to claim 1, wherein
the controller performs, based on the detected data of the sensor, a determination process to determine an intruding state where a part of a body of the user, belongings of the user, things worn by the user, or luggage placed on a luggage carrier of the electric mobility vehicle is intruding into an area in a detection area of the sensor and outside the detection cancel area, while the electric mobility vehicle is moving,
the controller is configured to perform at least one of notification process using a notification device provided in the electric mobility vehicle and process of changing travelling state of the electric mobility vehicle by controlling the motor, when the intruding state is determined,
the controller is configured to perform a stopping state determination process to determine whether the intruding state is caused or not in a state where the electric mobility vehicle is not moving based on an input to a predetermined computer or an input made to an input device provided in the mobility body,
the controller displays the intruding state by using the notification device when the intrusion state is determined in the stopping state determination process, and displays that the intruding state is not determined by using the notification device when the intruding state is not determined in the stopping state determination process.

13. The electric mobility vehicle according to claim 12, wherein
the notification device is a display or a voice/sound generating device,
the controller gives a request to the user to have the user move knees of the user toward an outside in the width direction, by using the display or the voice/sound generating device.

14. The electric mobility vehicle according to claim 1, wherein
the controller performs display process in which one or plurality of alternative candidate areas for adjusting the detection cancel area are displayed on a display provided in the mobility body or a display of a predetermined terminal computer, and
when an input for choosing one of the alternative candidate areas is made to the predetermined terminal computer or an input device, the controller changes the detection cancel area to the alternative candidate area which corresponds to the input.

15. The electric mobility vehicle according to claim 1, wherein the lower side sensor is configured to detect the object to be avoided in the lower side area while the object to be avoided is located at a width center of the mobility body.

16. An electric mobility vehicle on which a user is to be seated to ride, the electric mobility vehicle comprising:
a mobility body having a wheel, a motor for driving the wheel, and a seat on which the user is to be seated; and
a sensor provided in the mobility body to be positioned above an upper end of a front wheel, the front wheel being the wheel or another wheel, wherein
the mobility body comprises a controller which controls the motor by using detected data of the sensor for automatic driving, automatic stopping, or a combination of the automatic driving and the automatic stopping,
the controller is configured to be able to set a detection cancel area, in the detected data,
the sensor provided in the mobility body is constructed and arranged to sense objects in the detection cancel area,
the detection cancel area is set to include at least a front-side cancel area located at a front side relative to a footrest portion of the electric mobility vehicle or a footrest-portion cancel area located over the footrest portion,
the electric mobility vehicle further includes a lower side sensor located below the upper end of the front wheel, wherein the lower side sensor is capable of detecting an object to be avoided in a lower side area from under a footrest surface for the user, from a front end portion of the footrest portion, or from under a lower surface of the electric mobility vehicle, the lower side area includes at least an area under the front-side cancel area or an area under the footrest-portion cancel area, and
the controller controls the motor for an evading operation when the lower side sensor detects the object to be avoided in the lower side area.

17. The electric mobility vehicle according to claim 16, wherein the lower side sensor is configured to detect the object to be avoided in the lower side area while the object to be avoided is located at a width center of the mobility body.

* * * * *